United States Patent
Choi et al.

(10) Patent No.: US 9,752,202 B2
(45) Date of Patent: Sep. 5, 2017

(54) HIGH CLEANLINESS MOLTEN STEEL PRODUCTION METHOD AND REFINING DEVICE

(71) Applicant: POSCO, Pohang-si, Gyeongsangbuk-do (KR)

(72) Inventors: Ja Yong Choi, Pohang-si (KR); Seung Min Han, Pohang-si (KR); Sun Koo Kim, Pohang-si (KR); Hee Ho Lee, Pohang-si (KR); Sang Yuel Jung, Pohang-si (KR); Young Jong Seo, Pohang-si (KR)

(73) Assignee: POSCO, Pohang-si (KR)

( * ) Notice: Subject to any disclaimer, the term of this patent is extended or adjusted under 35 U.S.C. 154(b) by 104 days.

(21) Appl. No.: 14/400,908

(22) PCT Filed: May 13, 2013

(86) PCT No.: PCT/KR2013/004222
§ 371 (c)(1),
(2) Date: Nov. 13, 2014

(87) PCT Pub. No.: WO2013/172613
PCT Pub. Date: Nov. 21, 2013

(65) Prior Publication Data
US 2015/0122083 A1 May 7, 2015

(30) Foreign Application Priority Data

May 14, 2012 (KR) .................. 10-2012-0051019
May 14, 2012 (KR) .................. 10-2012-0051024
(Continued)

(51) Int. Cl.
*B22D 41/00* (2006.01)
*C21C 7/00* (2006.01)
(Continued)

(52) U.S. Cl.
CPC .............. *C21C 7/00* (2013.01); *B22D 1/00* (2013.01); *B22D 11/116* (2013.01);
(Continued)

(58) Field of Classification Search
CPC .................... B22D 43/004; B22D 41/00
(Continued)

(56) References Cited

U.S. PATENT DOCUMENTS 2,915,380 A * 12/1959 Hilty .................. C21C 5/56
266/142
3,556,775 A * 1/1971 Kuratomi ............ C21C 5/567
75/525

(Continued)

FOREIGN PATENT DOCUMENTS

JP 52-143922 11/1977
JP S5310303 A 1/1978
(Continued)

*Primary Examiner* — Scott Kastler
(74) *Attorney, Agent, or Firm* — The Webb Law Firm

(57) ABSTRACT

Provided are a method and a refining device for producing molten steel of outstanding cleanliness, and more particularly provides a method and device for refining inclusions by forming droplets from molten steel and dropping same into slag during pre-processing in a continuous casting process in a steel-making process. Also, provided is a method for producing high cleanliness molten steel comprising a molten-steel supply device for supplying molten steel and a molten-steel refining device for containing and refining molten steel poured into the molten-steel supply device, wherein the method comprises: a molten-steel pouring step in which molten steel is poured from the molten-steel supply device into the molten-steel refining device; a droplet-forming step in which the molten steel which has been poured in is formed into droplets in the molten-steel refining device; a slag-pass-through step in which the molten steel which has been formed into droplets is dropped so as to pass (Continued)

through slag; and an inclusion-removing step in which residual inclusions in the molten steel, which has been formed into droplets, are removed while passing through the slag.

19 Claims, 12 Drawing Sheets

(30) Foreign Application Priority Data

May 14, 2012 (KR) .......................... 10-2012-0051025
May 14, 2012 (KR) .......................... 10-2012-0051031

(51) Int. Cl.
- *C21C 7/076* (2006.01)
- *B22D 11/118* (2006.01)
- *B22D 41/08* (2006.01)
- *B22D 1/00* (2006.01)
- *B22D 11/116* (2006.01)
- *C21C 7/06* (2006.01)

(52) U.S. Cl.
CPC ............ *B22D 11/118* (2013.01); *B22D 41/00* (2013.01); *B22D 41/08* (2013.01); *C21C 7/0075* (2013.01); *C21C 7/076* (2013.01); *C21C 7/06* (2013.01); *Y02P 10/242* (2015.11)

(58) Field of Classification Search
USPC .................................................. 266/227, 229
See application file for complete search history.

(56) References Cited

U.S. PATENT DOCUMENTS

| | | | | |
|---|---|---|---|---|
| 3,817,502 A | * | 6/1974 | Taylor ....................... | C21C 5/56 264/9 |
| 4,705,466 A | * | 11/1987 | Balassa ................... | B22F 3/115 164/417 |
| 5,511,766 A | | 4/1996 | Vassilicos | |
| 5,551,672 A | | 9/1996 | Schmidt | |
| 2004/0173055 A1 | | 9/2004 | Song et al. | |
| 2015/0122083 A1 | * | 5/2015 | Choi ....................... | C21C 7/076 75/560 |

FOREIGN PATENT DOCUMENTS

| | | |
|---|---|---|
| JP | 5253654 | 10/1993 |
| JP | 06-271922 | 9/1994 |
| JP | 7148558 A | 6/1995 |
| JP | 7188731 A | 7/1995 |
| JP | 07-195161 | 8/1995 |
| JP | 7216433 A | 8/1995 |
| JP | 9122852 A | 5/1997 |
| JP | 11279630 A | 10/1999 |
| JP | 3216384 B2 | 10/2001 |
| JP | 3470537 B2 | 11/2003 |
| JP | 200498066 A | 4/2004 |
| JP | 2007231410 A | 9/2007 |
| JP | 2008240126 A | 10/2008 |
| KR | 10-226898 | 7/1999 |
| KR | 100244637 B1 | 3/2000 |
| KR | 20000041671 A | 7/2000 |
| KR | 20000045503 A | 7/2000 |
| KR | 10-2001-0062898 A | 7/2001 |
| KR | 100328052 B1 | 5/2002 |
| KR | 20030052424 A | 6/2003 |
| KR | 1020040055392 A | 6/2004 |
| KR | 1020040056706 A | 7/2004 |
| KR | 100696938 B1 | 3/2007 |
| KR | 1020070057326 A | 6/2007 |
| KR | 1020080061832 A | 7/2008 |

* cited by examiner

HIGH CLEANLINESS MOLTEN STEEL PRODUCTION METHOD AND REFINING DEVICE

CROSS-REFERENCE TO RELATED APPLICATIONS

This application is the United States national phase of International Application No. PCT/KR2013/004222 filed May 13, 2013, and claims priority to Korean Patent Application Nos. 10-2012-0051019, 10-2012-0051031, 10-2012-0051024, and 10-2012-0051025 filed May 14, 2012, the disclosures of which are hereby incorporated in their entirety by reference.

TECHNICAL FIELD

The present invention relates to a high cleanliness molten steel production method and a refining device, and more particularly, to a method for manufacturing high cleanliness molten steel of outstanding cleanliness by forming molten steel into droplets and a refining device.

BACKGROUND ART

Generally, when nonmetallic inclusions among molten steel are not removed between a steel-making process and a continuous casting process but remain on a thin sheet, it may cause scabs for large inclusions or sliver scabs on steel sheets. In case of wire rod steel sheet, this may be a cause for disconnection. In case of stainless steel sheets, however, if the nonmetallic inclusions remain on the steel sheet, there may be problems in terms of corrosion resistance. Therefore, the quality of the final product may be negatively affected.

Also, to decarbonize molten steel, oxyfuel gas may be blown into molten steel at various facilities (revolving furnace, RH, AOD, VOD). After decarbonization reaches the target concentration, molten steel has high oxygen concentration. Accordingly, deoxidizer is added to reduce such oxygen concentration, and generally, alloy or pure substance which uses Al, Si, MN, and the like, as main ingredients is used. However, when alumina ($Al_2O_3$), silica ($SiO_2$) or a deoxidizer is combined/added for a deoxy product, a complex oxide may exist among molten steel. Meanwhile, when steel is taken out from AOD smelting furnace, inclusions on slag may exist on molten steel because the steel is taken out at the same time as the slag, and for the inclusions on the slag, spinell inclusions of high melting point may be extracted due to temperature drop.

Accordingly, it is necessary to minimize the adverse influence that is made on the qualities of the final products by prohibiting inclusions from being formed or removing inclusions formed, from a steel-making process, which is a process before solidification of molten steel is completed, to a continuous casting process.

To overcome the aforementioned problem, the purpose of the present invention that is contrived is to provide a method for manufacturing high cleanliness molten steel by suppressing inclusions from being formed or removing inclusions formed from a steel-making process to a continuous casting process.

Also, another purpose of the present invention is to provide a refining device for manufacturing high cleanliness molten steel.

SUMMARY OF THE INVENTION

According to features of the present invention to achieve the purposes as described above, the present invention is related to a method for manufacturing high cleanliness molten steel by including a molten steel supply device configured to supply molten steel and a molten steel refining device configured to accommodate and refine molten steel poured from the molten steel supply device, wherein the method comprises: a molten steel pouring step in which molten steel is poured from the molten steel supply device into the molten steel refining device; a droplet-forming step in which the poured molten steel is formed into droplets in the molten steel refining device; a slag-pass-through step in which the molten steel formed into droplets is allowed to fall to pass through slag; and an inclusion-removing step in which residual inclusions of the molten steel formed into droplets are removed while the molten steel formed into droplets pass through the slag.

Also, in the molten steel pouring step, the molten steel may be poured by using a long nozzle.

Also, in the molten steel pouring step, the molten steel may be poured in a form of molten steel stream.

Also, the molten steel supply device and the molten steel refining device may be ladles for steel manufacture.

Also, the molten steel supply device may be a ladle for casting, and the molten steel refining device may be a tundish.

Also, a step for temporarily storing molten steel for droplets before forming molten steel into droplets and moving the stored molten steel to the droplet forming step after the molten steel pouring step may be further included.

Also, the droplet-forming step may make the poured molten steel fall by passing the poured molten steel through a droplet forming portion having a plurality of droplet holes.

Also, a diameter of the droplet hole may be 6.5 mm or less.

Also, the slag may be molten slag. Also, the slag may be 20 mm thick or greater.

Also, as percentages by weight, the slag may be (% CaO)+(% $SiO_2$)+(% $Al_2O_3$)+(% MgO)>95% and may include (% CaO): 30~40%, (% $SiO_2$): 15~35%, (% $Al_2O_3$): 15~30%, (% MgO): 10~20%.

Also, as percentages by weight, the molten steel may include 0.02% to 0.1% Al, and the slag may include CaO: 34%~49.2%, $Al_2O_3$: 43.2%~54.8%, and MgO: 7.5%~11%.

Also, as percentages by weight, the molten steel may include 10 ppm or less in term of Al content before refinement, and the slag may include CaO: 13.6%~48.3%, $SiO_2$: 41.5%~54.7%, and MgO: 10%~29%.

According to another aspect of the present invention, there is provided a molten steel refining device that performs refinement using poured molten steel poured in from the molten steel supply device, wherein the high cleanliness molten steel refining device includes a droplet forming device for forming molten steel poured into droplets.

Also, the molten steel refining device may be the tundish.

Also, the tundish may include the droplet forming device in a tundish body, wherein the droplet forming device may be adjacent to a lower region into which the molten steel is poured.

Also, the droplet forming device may include the droplet forming portion having a plurality of droplet holes at a central part of a container for forming molten steel into droplets.

Also, a circumference of the droplet forming portion may be made of sidewalls extending to an upper portion.

Also, the droplet forming device may include a molten steel accommodating portion at a lower portion of a molten steel pouring area in the tundish body to accommodate the molten steel poured from the molten steel supply device and may move the poured in molten steel to the droplet forming portion via the molten steel accommodating portion.

Also, the molten steel accommodating portion may include a molten steel storage space inside and may be formed at lower portion of the molten steel pouring area, adjacent to an inner surface and a lower surface of the tundish body.

Also, the droplet forming portion may be coupled to an upper part of the molten steel accommodating portion by passing through an opening by forming the opening on an opposite side of a region where the plurality of droplet holes are formed or may be mounted on the upper part of an outer circumference surface of the molten steel storage space of the molten steel accommodating portion.

Also, the droplet forming portion may be supported by a weir provided in the tundish body.

Also, sidewalls on one side of the droplet forming portion may be supported by the weir and sidewalls on the other side may be supported by the molten steel accommodating portion.

Also, the sidewalls on the one side of the droplet forming portion may be supported by the weir and the sidewalls on the other side may be supported by being coupled to the inner surface of the tundish body.

Also, sidewalls of the droplet forming portion adjacent to the molten steel accommodating portion may be formed lower than sidewalls on the other side.

Also, the diameter of the droplet hole may be 6.5 mm or less.

Also, there may be formed molten slag with a thickness of 20 mm or greater at a lower region onto which molten steel formed into droplets falls by passing through the droplet holes of the droplet forming portion, and as percentages by weight, the slag may be (% CaO)+(% $SiO_2$)+(% $Al_2O_3$)+(% MgO)>95%, and may include (% CaO): 30~40%, (% $SiO_2$): 15~35%, (% $Al_2O_3$): 15~30%, (% MgO): 10~20%.

Also, there may be formed molten slag at a lower region onto which molten steel formed into droplets falls by passing through the droplet holes of the droplet forming portion, and as percentages by weight, the molten steel may include 0.02% to 0.1% Al, and the slag may include CaO: 34%~49.2%, $Al_2O_3$: 43.2%~54.8%, and MgO: 7.5%~11%.

Also, there may be formed molten slag at a lower region onto which molten steel formed into droplets falls by passing through the droplet holes of the droplet forming portion, and as percentages by weight, the molten steel may include 10 ppm or less Al content before being refined, and the slag may include CaO: 13.6%~48.3%, $SiO_2$: 41.5%~54.7%, and MgO: 10%~29%.

Also, the molten steel refining device may be a ladle for steel manufacture.

Also, the ladle may further include the droplet forming device configured to form into droplets the molten steel poured from the molten steel supply device, wherein the droplet forming device may include the droplet forming portion having a plurality of droplet holes at the central part of the container for forming molten steel into droplets.

Also, a circumference of the container of the droplet forming portion may be made of sidewalls extending to an upper portion and may be supported by the inner sidewalls of the ladle.

Also, the droplet forming device may include the molten steel accommodating portion in the ladle or on an external region to accommodate molten steel poured from the molten steel supply device and move the molten steel that is poured to the droplet forming portion via the molten steel accommodating portion.

Also, the diameter of the droplet hole may be 6.5 mm or less.

Also, there may be formed molten slag with a thickness of 20 mm or greater at a lower region onto which molten steel formed into droplets falls by passing through the droplet holes of the droplet forming portion, and as percentages by weight, the slag may be (% CaO)+(% $SiO_2$)+(% $Al_2O_3$)+(% MgO)>95% and may include (% CaO): 30~40%, (% $SiO_2$): 15~35%, (% $Al_2O_3$): 15~30%, (% MgO): 10~20%.

Also, there may be formed molten slag at a lower region to which molten steel formed into droplets falls by passing through the droplet holes of the droplet forming portion, and as percentages by weight, the molten steel may include 0.02% to 0.1% Al, and the slag may include CaO: 34%~49.2%, $Al_2O_3$: 43.2%~54.8%, and MgO: 7.5%~11%.

Also, there may be formed molten slag at a lower region to which molten steel formed into droplets falls by passing through the droplet holes of the droplet forming portion, and as percentages by weight, the molten steel may include 10 ppm or less Al content before being refined, and the slag may include CaO: 13.6%~48.3%, $SiO_2$: 41.5%~54.7%, and MgO: 10%~29%.

According to yet another aspect of the present invention, the present invention includes a high cleanliness molten steel refining device including: a tundish having a tundish body and a tundish cover for covering one side of the tundish body; and a droplet forming device having a molten steel accommodating portion formed by blocking an inside of the tundish body with a first weir and a droplet forming portion adjacent to the molten steel accommodating portion and configured to form molten steel transferred from the molten steel accommodating portion into droplets.

Also, the molten steel accommodating portion may be a space between the first weir and inner sidewalls of the tundish body.

Also, the droplet forming portion may be provided on an opposite side of the molten steel accommodating portion with the first weir as the reference.

Also, there may be further included a second weir that is supported on the inner sidewalls of the tundish body and that supports the droplet forming portion.

Also, the droplet forming portion may be supported by the first weir and the second weir in a space between the first weir and the second weir.

Also, a lower portion of the second weir may be open.

Also, the molten steel may be transferred to the droplet forming portion by being overflown from the molten steel accommodating portion.

Also, the molten steel formed into droplets by passing through the droplet forming portion may be stored in a molten steel storage portion on an opposite side of the molten steel accommodating portion of the tundish body.

Also, there may be a slag on an upper surface of the molten steel stored in the molten steel storage portion, and the molten steel formed into droplets by passing through the droplet forming portion may be stored in the molten steel storage portion by going through the slag and in a refined state.

Also, there may be formed molten slag with a thickness of 20 mm or greater at a lower region to which molten steel formed into droplets falls by passing through the droplet holes of the droplet forming portion, and as percentages by weight, the slag may be (% CaO)+(% $SiO_2$)+(% $Al_2O_3$)+

(% MgO)>95% and may include (% CaO): 30~40%, (% SiO$_2$): 15~35%, (% Al$_2$O$_3$): 15~30%, (% MgO): 10~20%.

Also, there may be formed molten slag at a lower region to which molten steel formed into droplets falls by passing through the droplet holes of the droplet forming portion, and as percentages by weight, the molten steel may include 0.02% to 0.1% Al, and the slag may include CaO: 34%~49.2%, Al$_2$O$_3$: 43.2%~54.8%, and MgO: 7.5%~11%.

Also, there may be formed molten slag at a lower region to which molten steel formed into droplets falls by passing through the droplet holes of the droplet forming portion, and as percentages by weight, the molten steel may include 10 ppm or less Al content before being refined, and the slag may include CaO: 13.6%~48.3%, SiO$_2$: 41.5%~54.7%, and MgO: 10%~29%.

Also, the droplet forming portion may include a plurality of droplet holes to form the molten steel transferred from the molten steel accommodating portion into droplets.

Also, the droplet forming portion may include stepped parts. One of the stepped parts that is adjacent to the molten steel accommodating portion may have a shorter height than the other stepped part that is away from the molten steel accommodating portion.

Also, the molten steel accommodating portion may receive the molten steel from the ladle through the long nozzle.

According to the present invention, molten steel having outstanding cleanliness may be manufactured by minimizing inclusions produced from a steel-making process to a continuous casting process.

Also, in the present invention, there may be provided a refining device configured to manufacture molten steel of outstanding cleanliness, thereby economically manufacturing high cleanliness steel having outstanding quality for quality of a final product.

Also, the high cleanliness molten steel refining device according to the present invention may manufacture high cleanliness molten steel by reducing an amount of inclusions produced and a total oxygen amount.

Also, according to the present invention, the molten steel accommodating portion is formed by blocking the tundish body with the first weir, the space between the molten steel accommodating portion and the droplet forming portion may be minimized without additional consideration, and accordingly the time the process takes may be shorter, and the structure may be made simple.

Also, according to the present invention, a size of an inside of the molten steel accommodating portion and an area of the droplet forming portion may be made relatively large, thereby easily satisfying demanded casting speed.

DETAILED DESCRIPTION OF THE INVENTION AND BEST MODE

Figure 1:
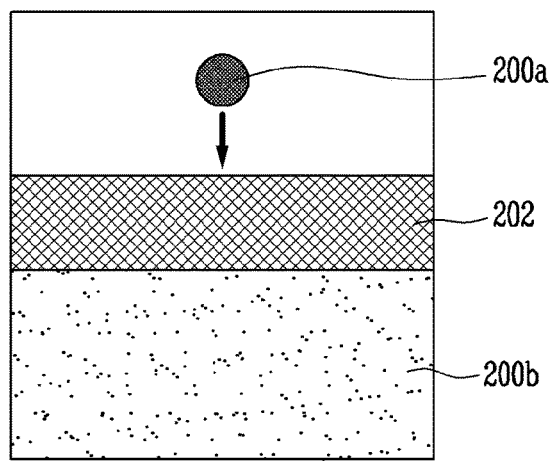
FIG. 1 is a process schematic diagram for describing a method of manufacturing high cleanliness molten steel according to an embodiment.

Details of other embodiments are included in the detailed description and the drawings.

Hereinafter, the present invention will be described more clearly in reference to drawings, and advantages and features of the present invention, and a method of achieving them will be made clear by referring to embodiment described later in detail along with the accompanying drawings. However, the present invention is not limited to the embodiments disclosed below but may be implemented in various different modes, and when it is described below that a specific portion is connected to another portion, then it includes not only the case where the two are directly connected, but also the case where the two are electrically connected with a different device in the middle inbetween. Furthermore, in drawings, portions unrelated to the present invention have been omitted to clarify the description of the present invention, and same reference numerals are attached with respect to similar portions throughout the entire specification.

Various technologies have been made known as a method for manufacturing high cleanliness molten steel by suppressing inclusions from being formed or removing inclusions from a steel-making process, which is a process that is performed before solidification of molten steel is completed, to a continuous casting process In the steel-making process, a method for promoting floatation-separation of inclusions by controlling molten steel stirring time and stirring intensity when refining ladle has been known (Japanese Patent Publication No. 2007-231410, Japanese Patent Publication No. 2008-240126).

Also, a method for improving floatation-separation by promoting collection-assembly of inclusions by electromagnetic vibration has been disclosed (Korean Patent Publication No. 2003-52424).

On the other hand, a method for removing inclusions by float-separation the inclusions existing at molten steel with slag existing to an upper portion of the molten steel by using stirring, microbbubles, electromagnetic vibration and the like as described above has a limitation in that the inclusions need to be moved to the slag existing at the upper portion within given time.

Meanwhile, for a continuous casting process, a method for removing inclusions through inert gas blow-in to a nozzle which is a path for molten steel supplied from a ladle to a tundish is known (Japanese Registered Patent No. 2001-3216384).

Also, a method for maximizing floatation of inclusions has been disclosed for controlling molten steel flow through installation of an impact pad in a tundish (U.S. Pat. No. 5,551,672, Korean Patent Publication No. 2004-55392).

However, the method for blowing in inert gas into a nozzle in a continuous-casting process may cause sliver defect for pin-hole on a steel sheet surface when microbubbles remain, and also the method for controlling molten steel flow through installation of an impact pad cannot make all molten steel flow into rising flow. Therefore, there is a problem in that efficiency of removal of inclusions is not high.

The present invention is completely different from existing, widely made known technologies and methods of approaching the same in manufacturing high cleanliness steel. Particularly, the present invention may be applied to all processes from the steel making process to the continuous casting process.

One embodiment of the present invention mainly consists of a method of manufacturing molten steel supplied from a ladle to a tundish and a refining device thereof, and another embodiment consists of, in a steel-making process, a method of manufacturing high cleanliness steel and a refining device thereof. Hereinafter, high cleanliness molten steel manufacturing process is described as the basic technical concept that may be applied to all processes from the steel-making process and continuous casting process for the present invention, and then the refining device that may apply it to each process will be described.

I. High Cleanliness Steel Manufacturing Method

As one embodiment of the present invention, a process for manufacturing high cleanliness molten steel is described. The present invention may begin from a step of pouring molten steel into a molten steel refining device configured to refine molten steel by receiving the molten steel poured from a molten steel supply device configured to supply molten steel for manufacturing steel. After this, a droplet forming step is performed in which the poured-in molten steel is formed into droplets in the molten steel refining device. After this, high cleanliness molten steel may be manufactured by including a slag pass-through step in which molten steel passes through slag by dropping molten steel formed into droplets and an inclusion removing step in which remaining inclusions of the molten steel are removed through the slag while passing through the slag. Here, the molten steel supply device and the molten steel refining device may each use a ladle used in a steel-making process, or the molten steel refining device may use a tundish in a casting step.

In the present invention, it may be possible to pour molten steel in a form of molten steel stream or by using a long nozzle even when pouring the molten steel from the molten steel supply device to the molten steel refining device. The molten steel poured from the molten steel supply device to the molten steel refining device directly passes through a droplet forming portion provided in the molten steel refining device, and thus the droplet forming process is performed. After this, the molten steel formed into droplets may fall and pass through the slag.

However, in such case problems may arise relating to an impact or scattering from the falling of the molten steel, and in consideration thereof, an additional molten steel accommodating portion may be provided in the molten steel refining device. Therefore, a step of temporarily storing molten steel for forming into droplets before molten steel is formed into droplets may be added after the molten steel pouring step.

In the molten steel droplet forming step, the poured-in molten steel is formed into minute droplets having a specific size and passes through the slag. This is because the molten steel falls, passing through the droplet forming portion which is container shaped and which has a plurality of droplet holes. Also, inclusions may be removed as the molten steel that is formed into droplets passes through the slag. The slag may use molten slag with a specific thickness or greater. The slag may be provided in a lower portion of the droplet forming portion in advance.

As one embodiment of the present invention, the molten steel supply device being a ladle for casting and the molten steel refining device being a tundish is described as an example. That is, when the present invention is applied in a casting step, it may be a process in which molten steel is supplied from the ladle to the tundish. Here, when the molten steel is supplied from the ladle which is the molten steel supply device to the tundish which is the molten steel refining device, molten steel droplets are formed through the droplet forming portion which is a refractory container having a hole with a diameter of 6.5 mm or smaller located in the tundish. The molten steel formed into droplets is dropped onto a slag layer having a proper composition with a thickness of 20 mm or greater. Thus, the inclusions from the molten steel droplets may be removed using the slag layer.

FIG. 1 schematically shows a process in which refining is performed by forming molten steel into droplets through a droplet forming device provided at a molten steel refining device which is an embodiment of the present invention. FIG. 1 is for describing technical concept of the present invention applicable to all processes including a steel-making process and a continuous casting process.

Referring to FIG. 1, the molten steel droplet forming device provided in the molten steel refining device forms minute droplets (a) having a specific size from the molten steel that is supplied from the molten steel supply device. After this, the molten steel droplets (a) having a specific size fall and collide with a surface of slag (b) made of composition relating to an embodiment of the present invention. And while the molten steel droplets pass through the slag (b), the inclusions in the molten steel are absorbed by the slag during the collision process. The molten steel droplets that fell due to specific gravity difference are absorbed by a lower molten steel layer (c). In this case, for the molten steel which passed through the slag (b), the inclusions are removed by the slag (b). Thus, molten steel of outstanding cleanliness is formed at a lower portion. As such, in the present invention, molten steel is formed into droplets through the droplet forming device in the molten steel refining device, and the molten steel droplets are made to pass through the slag having a specific thickness. While in a process of passing through the slag, the inclusions of molten steel droplet interface and the like are absorbed by the slag, thereby achieving a refining process.

Figure 2A:
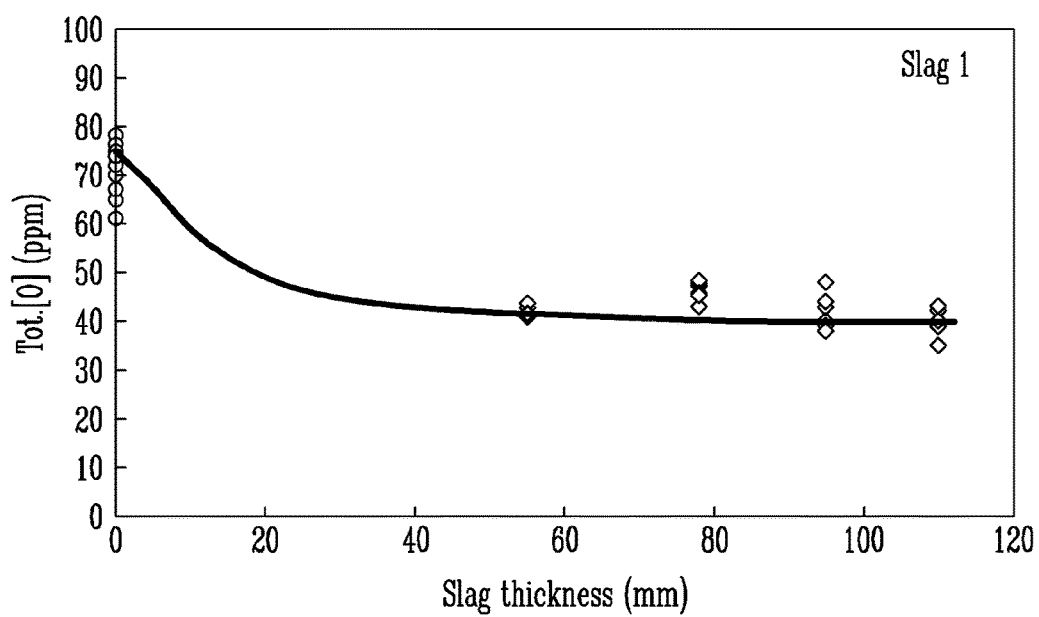
FIGS. 2a and 2b are graphs showing the relationship between slag thickness and the total oxygen content of molten steel according to an embodiment.
Figure 2B:
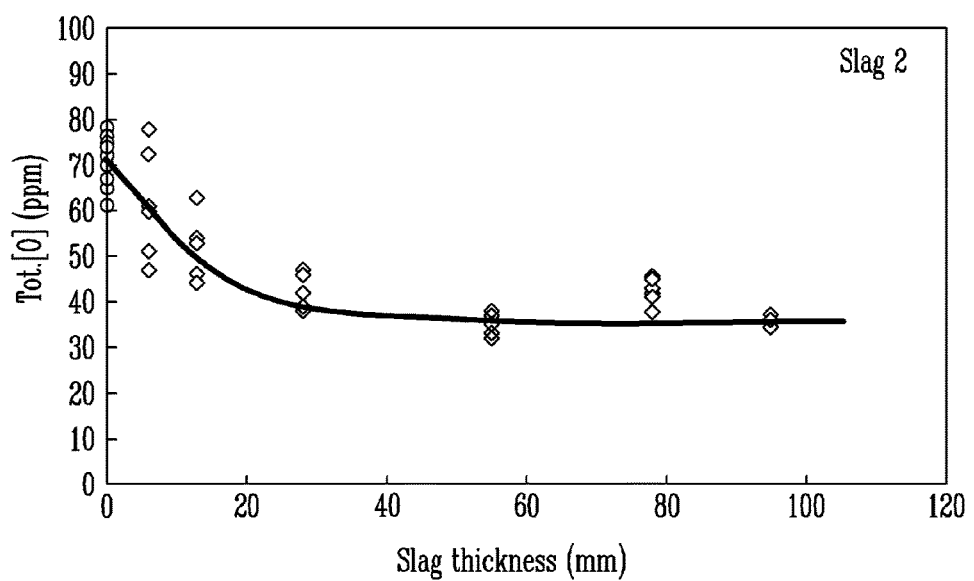

FIGS. 2a and 2b are graphs showing the relationship of a total oxygen content of molten steel according to a thickness of slag when molten steel droplets pass through the slag. Particularly, FIGS. 2a and 2b each shows the relationship of the total oxygen content using the slag having different compositions. In an embodiment of the present invention, regarding the total oxygen content of molten steel, the specimen obtained by sampling the molten steel which passed through the slag was analyzed. The total oxygen content and an inclusion oxygen content of molten steel could be obtained using Formula (1) below.

total oxygen=soluble oxygen+inclusion oxygen    [Formula 1]

Generally, since soluble oxygen is determined by temperature and molten steel ingredients, if temperature and molten steel ingredients are consistent, soluble oxygen will have a specific value. Therefore, when temperature and molten steel ingredients are consistent, relative difference of total oxygen represents difference in content of inclusions. Therefore, based on total oxygen content development, inclusion removal efficiency may be determined.

As can be seen from FIGS. 2a and 2b, compared to the total oxygen content in the case where slag thickness is 0 mm, i.e., where no slag is used, in the case where slag is used, efficiency of inclusion removal gradually increases according to increase in slag thickness. However, it can be known that the inclusion removal efficiency is almost consistent when slag has specific critical thickness or greater. And FIGS. 2a and 2b show that the inclusion removal efficiency becomes consistent when, similarly, slag thickness has specific critical value or greater even when different types of slags are used in each. Eventually, in an embodiment relating to the present invention, when the inclusions are removed by forming molten steel into droplets, the molten steel droplets are caused to pass through slag having consistent thickness, and it can be seen that effect becomes consistent when the slag thickness exceeds specific critical value. FIGS. 2a and 2b show that slag thickness relating to an embodiment of the present invention must secure at least 20 mm.

Figure 3:
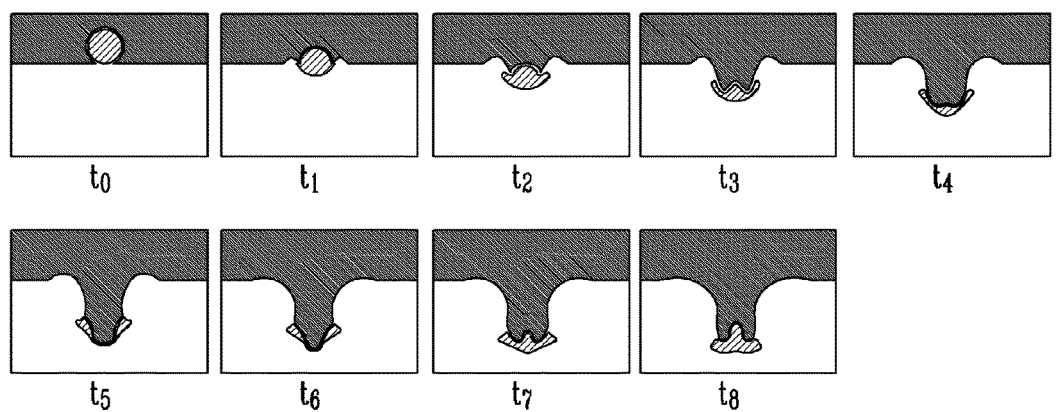
FIG. 3 is a chart continuously showing a phenomenon in which molten steel formed into droplets reacts on a slag surface.

FIG. 3 is a photograph chart continuously showing a phenomenon in which molten steel formed into droplets reacts on a slag surface. As can be seen from the figure, when molten steel formed into droplets collides with and passes through the slag surface, the inclusions may be removed. First, change in the shape of a droplet over time as the molten steel droplet falls onto the slag surface (t0~t8) will be examined. The continuous photograph chart shows, first, that the molten steel droplet contacts the slag surface. After (t0), the molten steel droplet that collided with the slag surface shows a phenomenon (Spreading, $t_1$~$t_8$) where the droplet thinly spreads by contacting the slag on its surface by 50% or greater as time passes, and accordingly a moving distance for the inclusions inside the droplet is decreased while moving speed also increases. Therefore, the inclusions may be removed easily. Meanwhile, as can be seen from FIGS. 2a and 2b above, it can be confirmed from a result in which a difference in the inclusion removal efficiency is small when slag thickness has specific critical value or greater, that the inclusions are removed mostly when the molten steel droplets collide with the slag surface. Meanwhile, the removal efficiency may significantly decrease or also increase when the slag thickness is of critical thickness or less. This is because when the slag thickness is of critical thickness or less, an oxygen content of molten steel is caused to increase when the molten steel droplets collide with the slag. When the molten steel droplets collie with the slag, the slag is suspended and mixed in lower molten steel, increasing the oxygen content of molten steel. Therefore, in the present invention, it is important to secure the slag thickness to be at least 20 mm or greater.

Figure 4A:
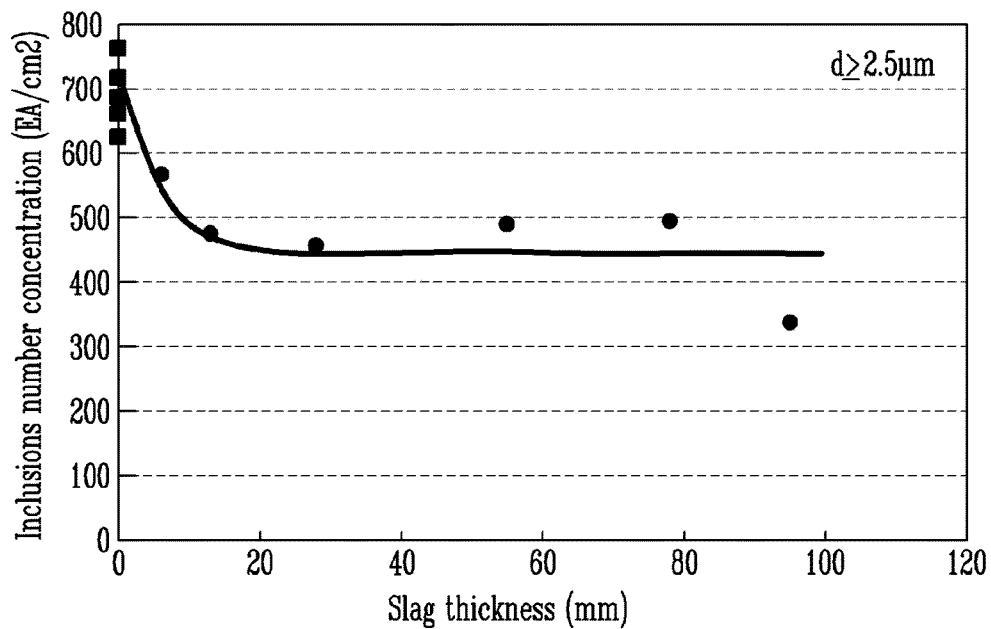
FIGS. 4a, 4b and 4c are graphs showing the relationship between slag thickness and the number and the concentration of the inclusions at solidified specimen according to an embodiment.
Figure 4B:
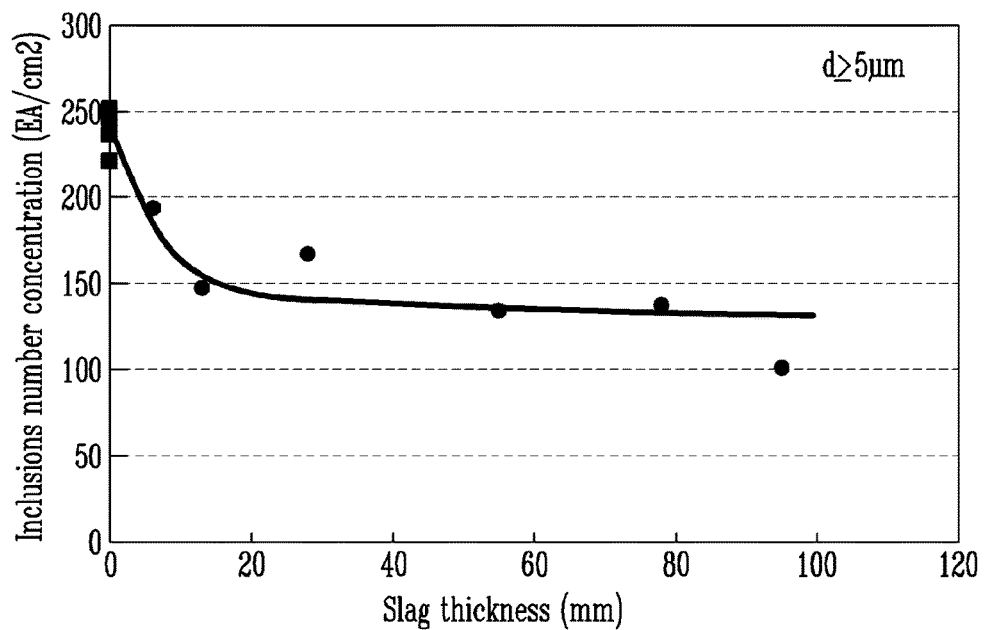
Figure 4C:
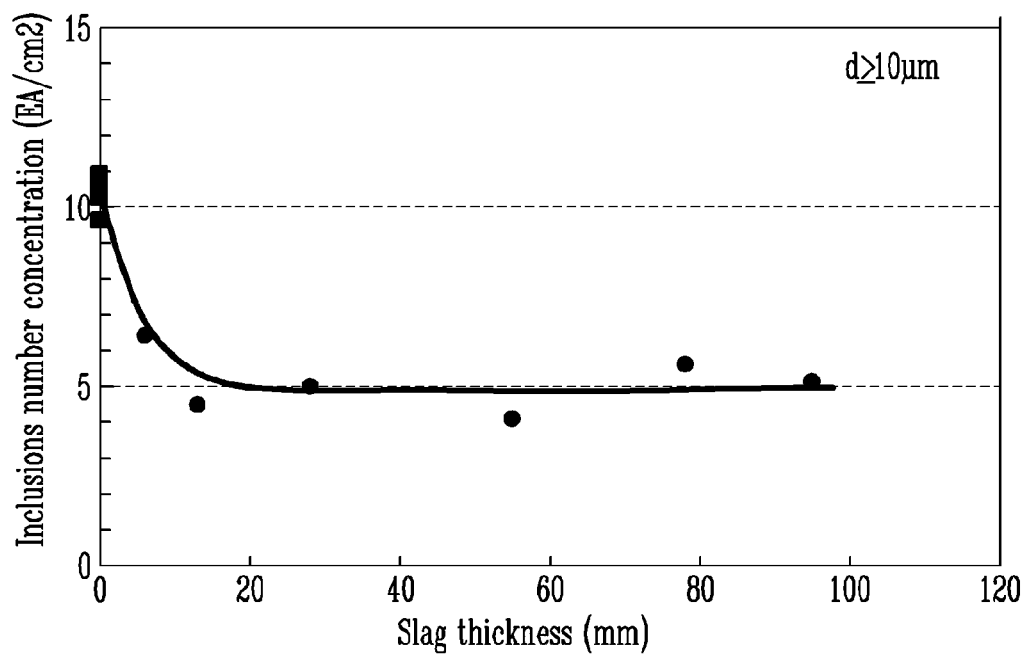

FIGS. 4a, 4b and 4c are graphs showing inclusions remaining at solidified specimen after refining molten steel formed into droplets according to slag thickness. As can be seen from the figures, the inclusions as divided according to a category of sizes of the inclusions (2.5 um or greater, 5 um or greater, 10 um or greater), the thicker the slag thickness, the less the concentration of remaining inclusions. However, it can be seen that the inclusion removal effect is insufficient for refining droplets which passed through a slag layer having critical thickness or less. If that is the case, it can be seen from results of FIGS. 2a and 2b and 4a, 4b and 4c that the thickness of the slag with which the droplets collide when refining the molten steel formed into droplets maximizes the inclusion removal effect and that there is critical thickness for minimizing side effects such as slag inflow and the like. Particularly, in an embodiment of the present invention, it is preferable to secure the thickness of the slag layer to be at least 20 mm or greater.

Hereinafter, regarding molten steel of various types, to improve a refining efficiency of molten steel formed into droplets, composition of slag is confirmed.

[Refining 300 Series Stainless Steel]

Meanwhile, when the molten steel droplet falls onto the slag, an influence that the slag composition has on the inclusion removal efficiency is shown in Table 1. Here, the molten steel is representative of 300 series stainless steel, and ST304 steel, for example, is used which includes 18% Cr—8% Ni—0.35% Si—1.1% Mn—0.05% C—0.0015% Al, and remaining includes Fe and unavoidable impurities.

As can be seen from Table 1, A1 and A2 compositions are shown to have an outstanding inclusion removal efficiency since a total oxygen decreased amount is 30~33 ppm after droplet refinement. However, it was shown that $Al_2O_3$ content among the inclusions that remained and were not removed was about 15~23%, respectively, showing a high increase. Accordingly, from this result, even though the inclusion removal efficiency of A1 and A2 compositions may be high, since there is a very high possibility of negatively influencing the quality due to formation of high melting point in the inclusions according to increase in the $Al_2O_3$ content among the remaining inclusions, it is unsuited. Meanwhile, it is possible to have low melting point in B1~B3 compositions according to decrease in the $Al_2O_3$ content among the remaining inclusions after the droplet refinement, but the inclusion removal efficiency is low as the total oxygen decreased amount is 12~24 ppm, and thus it is unsuited. However, the total oxygen decreased amount after the droplet refinement with C1~C3 compositions is 32~39 ppm, the inclusion removal efficiency is very outstanding, and also, even from an aspect of $Al_2O_3$ content change among the remaining inclusions, it is −3%~+2% and is suitable. Thus, it can be confirmed that its effect as droplet refining slag composition is high. Therefore, according to an embodiment of the present invention, it can be seen that the lower slag composition onto which the molten steel droplets fall at time of the droplet refinement is preferable to have CaO: 30~45%, %, $SiO_2$: 15~35%, $Al_2O_3$: 15~30%, and MgO: 10~20% composition.

TABLE 1

|    | Slag composition (wt. %) | | | | Total oxygen change before/after droplet refinement | Al$_2$O$_3$ content change among remaining inclusions (%) |
| --- | --- | --- | --- | --- | --- | --- |
|    | CaO | SiO$_2$ | Al$_2$O$_3$ | MgO | | |
| A1 | 52.4 | — | 40.2 | 7.4 | −30 | +23% |
| A2 | 36.5 | — | 52.4 | 11.1 | −33 | +15% |
| B1 | 32.7 | 40.7 | — | 26.6 | −23 | −3% |
| B2 | 24.8 | 47.1 | — | 28.1 | −24 | −8% |
| B3 | 7.7 | 59.5 | — | 32.8 | −12 | −10% |
| C1 | 30 | 35 | 15 | 20 | −32 | −3% |
| C2 | 44 | 26 | 20 | 10 | −39 | −2% |
| C3 | 44 | 16 | 30 | 10 | −34 | +2% |

[Refining Molten Steel Including 0.02~0.1% Aluminum Content]

The molten steel was refined using the above-described high cleanliness molten steel refining device using molten steel of aluminum deoxidized steel which consists of, as percentages by weight, Al: 0.02~0.1%, C: 0.08%, Si: 0.01%, Mn: 0.3%, and remaining steel and unavoidable impurities. The molten steel is, first, formed into droplets by causing it to pass through the droplet forming portion. Then, the molten steel formed into droplets passed through the slag. Change in composition of the slag before/after the molten steel formed into droplets passed through the slag is shown in Table 2. Also, in Table 6, a solid fraction (%) among the slag and change in the total oxygen (ppm) of the molten steel and change in Al are shown as results of the comparative examples and embodiments according to Table 2.

TABLE 2

|    | Slag composition before molten steel passed through (wt %) | | | | Slag composition after molten steel passed through (wt %) | | | |
| --- | --- | --- | --- | --- | --- | --- | --- | --- |
|    | CaO | SiO$_2$ | Al$_2$O$_3$ | MgO | CaO | SiO$_2$ | Al$_2$O$_3$ | MgO |
| Comparative example 1 | 32.6 | 40.6 | 0.2 | 26.6 | 32.6 | 11.7 | 33.8 | 10.4 |
| Comparative example 2 | 44.0 | 26.0 | 20.0 | 10.0 | 43.7 | 3.0 | 47.6 | 9.5 |
| Embodiment 1 | 30.5 | 0.3 | 65.0 | 4.2 | 31.0 | 0.6 | 65.0 | 4.0 |
| Embodiment 2 | 34.0 | 0.2 | 54.8 | 11.0 | 34.0 | 0.5 | 55.0 | 11.0 |
| Embodiment 3 | 45.4 | 0.3 | 45.4 | 8.9 | 45.5 | 0.5 | 45.4 | 8.5 |
| Embodiment 4 | 49.2 | 0.1 | 43.2 | 7.5 | 48.9 | 0.2 | 42.9 | 7.1 |
| Embodiment 5 | 52.4 | 0.2 | 44.4 | 3.0 | 52.9 | 0.3 | 43.8 | 3.0 |

TABLE 3

|    | Solid fraction of slag (%) | Al change of molten steel (ppm) | Total oxygen change of molten steel (ppm) |
| --- | --- | --- | --- |
| Comparative example 1 | 14.97 | −180 | 0 |
| Comparative example 2 | 0 | −150 | −2 |
| Embodiment 1 | 0 | −3 | −4 |
| Embodiment 2 | 0.8 | −2 | −4 |
| Embodiment 3 | 0.5 | +3 | −4 |
| Embodiment 4 | 0 | +5 | −5 |
| Embodiment 5 | 0 | +9 | −5 |

Referring to Table 2 and Table 3, in the event the molten steel of the aluminum deoxidized steel is formed into droplets and is refined using the slag including SiO$_2$, it can be confirmed that there was great change in composition of the slag before/after.

In comparative example 1, it could be confirmed that while the Al$_2$O$_3$ content before the molten steel passed through was 0.2 wt %, a ternary system slag of CaO—SiO2—MgO which contains a small amount, after the molten steel passed through, Al$_2$O$_3$ greatly increased to 33.8 wt %. Also, the degree of saturation of MgO decreased from 26.6 wt % to 10.4 wt %. Therefore, the decreased MgO was extracted, thereby forming solids. The solid fraction of the slag was shown to be approximately 15.0%. Also, Al among the molten steel decreased by 180 ppm, and the decreased Al was consumed/expended to restore the slag. Also, SiO$_2$ was restored, and approximately 136 ppm of Si was flown into the molten steel, changing the composition of the molten steel.

In comparative example 2, the slag before the molten steel passed through contained 26 wt % SiO$_2$, and no solid fraction of the slag was generated after the molten steel passed through. However, there was great change in content of SiO$_2$ and Al$_2$O$_3$ shown. This is because, similar to comparative example 1, Al among the molten steel was restored to SiO$_2$ and was consumed. That is, as Al content among the molten steel was reduced 150 ppm, Si increased 107 ppm. Accordingly, final desired quality was not shown.

As in the case of comparative examples 1 and 2 as described above, in the case of aluminum deoxidized steel, when SiO$_2$ content among the slag is great, the solid fraction of the slag increases or Al among the molten steel decreases and Si increases, and thus final desired quality could not be shown. Also, in the case of comparative example 1, change in the total oxygen is 0 ppm and therefore there is no inclusion removal efficiency, and in the case of comparative example 2, change in the total oxygen was −2 ppm and it could be confirmed that the inclusion removal efficiency was low In comparative examples 1 through 5, change in the total oxygen was approximately −4 ppm through approximately −5 ppm. Compared to comparative example 1, the change was 4 to 5 times the amount, and compared to comparative example 2, the change was 2 to 2.5 times the amount. Also, there was little change in the composition of the slag before and after the molten steel passed through, and it could be confirmed that there was no or low solid fraction among the molten steel Al change and the slag. Also, in embodiments 2, 3, the solid fraction among the slag was 0.8%, 0.5%, respectively, and therefore there was some solid fraction generated. However, compared to embodiments 1, 4, 5 having solid fraction as 0%, change in the total oxygen was similar. Therefore, it could be confirmed that the solid fraction being formed as 0.8%, 0.5% did not greatly affect refinement of the molten steel.

When refining the molten steel, the slag may absorb the inclusions of the molten steel, and the composition may change. Particularly, since the molten steel mainly consists of CaO, $SiO_2$ and $Al_2O_3$, the inclusions affect the composition of the slag in a molten steel refining process. When the molten steel of aluminum decarbonized steel is formed into droplets and is refined, $SiO_2$ may oxidize Al and thus it is an unsuitable ingredient. However, as can be seen from Table 4 and Table 5 above, if the slag contained a very small amount of $SiO_2$, it could be confirmed that no great influence was made. That is, $SiO_2$ contained in the inclusions was 1 wt % to 2 wt %, and an increased amount of $SiO_2$ among the slag due to inclusion absorption is a very small amount, and thus, it could be confirmed that increase in $SiO_2$ did not make a great influence in this embodiment.

On the other hand, in the case of $Al_2O_3$, as one of the main ingredients, it could be confirmed that a degree of saturation of MgO among the slag was greatly affected even with change of 1 wt % to 2 wt %. According to a constitutional diagram regarding CaO—$Al_2O_3$—MgO series slag, when the $Al_2O_3$, content exceeds 54.8% in a liquid region of 1550° C., the degree of saturation of MgO among the slag is significantly reduced. That is, in embodiment 1 in Table 4, since the $Al_2O_3$ content is 65 wt %, if refinement is continuously performed, the $Al_2O_3$ content increases and the degree of saturation of MgO among the slag is reduced. Accordingly, the solid fraction of the slag may increase.

Also, in the case of embodiment 5, $Al_2O_3$ changes in very small amount from 44.4 wt % to 43.8 wt %, and thus solubility of MgO significantly increases along saturation line of MgO. Therefore, although the solid fraction of the slag may not increase, melting of the tundish which consists of refractories including MgO is of concern. Accordingly, in the event the molten steel is, as percentages by weight, aluminum deoxidized steel (Al-killed) including 0.02% through 0.1% Al, the slag may be CaO—$Al_2O_3$—MgO, and it is preferable that the slag include CaO: 30.5~52.4%, $Al_2O_3$: 43.2~65%, and MgO: 3~11%.

[Refining Molten Steel Including Aluminum Content that is Less than 0.001%]

The molten steel was formed into droplets and refined using molten steel having the Al content that is 10 ppm or less (e.g., tire cord steel including Al: 0.0001%~0.001%, C: 0.75%, Si: 0.3%, Mn: 0.4%). Here, change in the composition of the slag before the molten steel passed through the slag and the composition of the slag after the molten steel passed through the slag was confirmed in each embodiment and comparative example by changing the composition and the content of the slag that is used as shown in Table 4. Also, in Table 5, change in the solid fraction (%) of the slag and the total oxygen (ppm) of the molten steel (ppm) and change in Al were shown as a result of the comparative example and the embodiments according to Table 4. Table 6 shows a result showing basicity (CaO/$SiO_2$) and viscosity according to each embodiment in embodiments 6 through 11.

TABLE 5

|  | Solid fraction of slag (%) | Al change of molten steel (ppm) | Total oxygen change of molten steel (ppm) |
| --- | --- | --- | --- |
| Comparative example 3 | 0 | +12 | −7 |
| Comparative example 4 | 0 | +5 | −6 |
| Embodiment 6 | 0.9 | −3 | −2 |
| Embodiment 7 | 0.3 | −3 | −4 |
| Embodiment 8 | 0.3 | −3 | −5 |
| Embodiment 9 | 0 | −3 | −5 |
| Embodiment 10 | 0 | −3 | −5 |
| Embodiment 11 | 0 | −3 | −6 |

TABLE 6

|  | Basicity (CaO/$SiO_2$) | Viscosity (poise) |
| --- | --- | --- |
| Embodiment 6 | 0.16 | 11 |
| Embodiment 7 | 0.25 | 4.2 |
| Embodiment 8 | 0.43 | 2.5 |
| Embodiment 9 | 0.67 | 2.4 |
| Embodiment 10 | 1.17 | 2.3 |
| Embodiment 11 | 1.29 | 1.6 |

Referring to Tables 4 through 6, in comparative examples 3 and 4 where the molten steel was formed into droplets and refined using the slag containing an excess $Al_2O_3$, it could be identified that the solid fraction was all 0%, and change in the total oxygen of the molten steel was all −7 ppm, −6 ppm. In case where the solid fraction is high for the slag, a function in which the inclusions in the molten steel are absorbed by contacting the molten steel is reduced relatively. Thus, the less the solid fraction of the slag, the better it is. Also, as described above, the reduction in the total oxygen refers to reduction in inclusion oxygen, which refers to reduction in inclusions. Therefore, it could be identified in both comparative examples 3 and 4 that there was an outstanding effect obtained in change in the solid fraction and the total oxygen.

On the other hand, it could be identified that, after the molten steel passed through, the $Al_2O_3$ content among the slag was reduced from 43.2 wt % to 22.1 wt % and from 20 wt % to 15.8%, respectively, which was picked up to the molten steel, the $Al_2O_3$ content among the molten steel of comparative examples 3 and 4 increased by 12 ppm, 5 ppm, respectively. That is, in comparative examples 3 and 4, as the molten steel passed through the slag, Al among the slag was absorbed, and the Al content rather increased compared to before. The inclusions among the molten steel mainly con-

TABLE 4

|  | Slag composition before molten steel passes through (wt %) | | | | Slag composition after molten steel passes through (wt %) | | | |
| --- | --- | --- | --- | --- | --- | --- | --- | --- |
|  | CaO | $SiO_2$ | $Al_2O_3$ | MgO | CaO | $SiO_2$ | $Al_2O_3$ | MgO |
| Comparative example 3 | 49.2 | — | 43.2 | 7.5 | 49.1 | 22.1 | 22.1 | 7.3 |
| Comparative example 4 | 44.0 | 26.0 | 20.0 | 10.0 | 44.0 | 33.0 | 15.8 | 9.9 |
| Embodiment 6 | 9.4 | 57.7 | 0.2 | 32.7 | 9.0 | 54.3 | 0.3 | 32.5 |
| Embodiment 7 | 13.6 | 54.7 | 0.3 | 31.4 | 14.0 | 52.4 | 0.4 | 30.8 |
| Embodiment 8 | 21.3 | 49.6 | 0.1 | 29.0 | 21.0 | 48.6 | 0.2 | 28.8 |
| Embodiment 9 | 29.0 | 43.3 | 0.2 | 27.5 | 29.0 | 43.7 | 0.3 | 27.0 |
| Embodiment 10 | 48.3 | 41.5 | 0.2 | 10.0 | 48.0 | 41.9 | 0.3 | 10.0 |
| Embodiment 11 | 53.4 | 41.3 | 0.3 | 5.0 | 52.9 | 40.4 | 0.4 | 5.0 | sist of CaO, SiO$_2$, Al$_2$O$_3$. As the molten steel passes through the slag, Al$_2$O$_3$ among the slag is picked up to among the molten steel, and accordingly, the Al content among the molten steel is gradually increased. Therefore, it could be identified that it was unsuited for molten steel with a very amount of the Al content like tire cord steel.

Referring to embodiments 6 through 11, it could be identified that there was very little change in composition of slag before molten steel formed into droplets passed through slag and after molten steel formed into droplets passed through slag. Also, it could be identified that solid fraction was below 1%, and change in Al content and total oxygen among molten steel change all were reduced. Therefore, it could be identified that it was possible to apply to product with very small amount of Al content like tire cord steel as final product.

In embodiments 6 through 8, unlike embodiments 9 through 11, there was content change in SiO$_2$ and MgO, and the solid fraction was shown to be 0.9%, 0.3%, 0.3%, respectively. The main ingredient of the solid fraction is forsterite (Mg2SiO4). This is because in embodiments 1 through 3, SiO$_2$ and MgO which were changed from the slag composition included forsterite among the solid fraction.

Also, although change in the Al content was the same in embodiments 6 through 8, change in the total oxygen showed some difference. It is determined that this results from a difference in basicity. In embodiment 6, the reason why change in the total oxygen, which is −2 ppm is relatively lower than in other embodiments is because viscosity in embodiment 6 is relatively high as shown in Table 6. In case where the slag includes CaO—SiO$_2$—MgO, viscosity is affected by basicity. That is, the less the basicity of the slag, the higher the viscosity is. In embodiment 6, viscosity of the slag is 11 poise and is shown to be about 2 times-6 times higher than in other embodiments. In embodiment 7, viscosity is 4.2 poise, and thus compared to embodiments 8 through 11, viscosity is shown to be about 1.5 times~2.5 times higher. Therefore, the higher the viscosity, the more difficult it is for the molten steel to pass through the slag and for the slag to absorb the inclusions among the molten steel. Therefore, in embodiments 6 and 7, change in the total oxygen was −2 ppm, −4 ppm, respectively, and thus it could be identified that a refinement efficiency decreased relatively.

In case of embodiments 8 through 11, change in the total oxygen was approximately −5 ppm~−6 ppm, and an outstanding effect was seen. Also, viscosity was 1.6 poise~2.5 poise and thus was low, and it could be identified that an efficiency of the slag was relatively high. On the other hand, referring to a constitutional diagram for CaO—Al$_2$O$_3$—MgO series at 1500° C., in embodiment 6, even if SiO$_2$ content increased less than 1%, the degree of saturation increased 2 times~3 times. Therefore, in case where continuous casting is performed on the molten steel using the slag as in embodiment 11, the longer the continuous casting is performed, the more the content of SiO$_2$, which is inclusions absorbed at the molten steel, increases in the slag. This may cause melting of the tundish consisting of refractories, and in embodiment 6, it is good to exclude it when using it for a long time.

The method may be applied with respect to the molten steel containing 10 ppm Al content or less before being refined. Here, it is preferable that the slag include, as percentages by weight, as percentages by weight, CaO: 13.6%~48.3%, SiO$_2$: 41.5%~54.7%, MgO: 10~29%.

Figure 5:
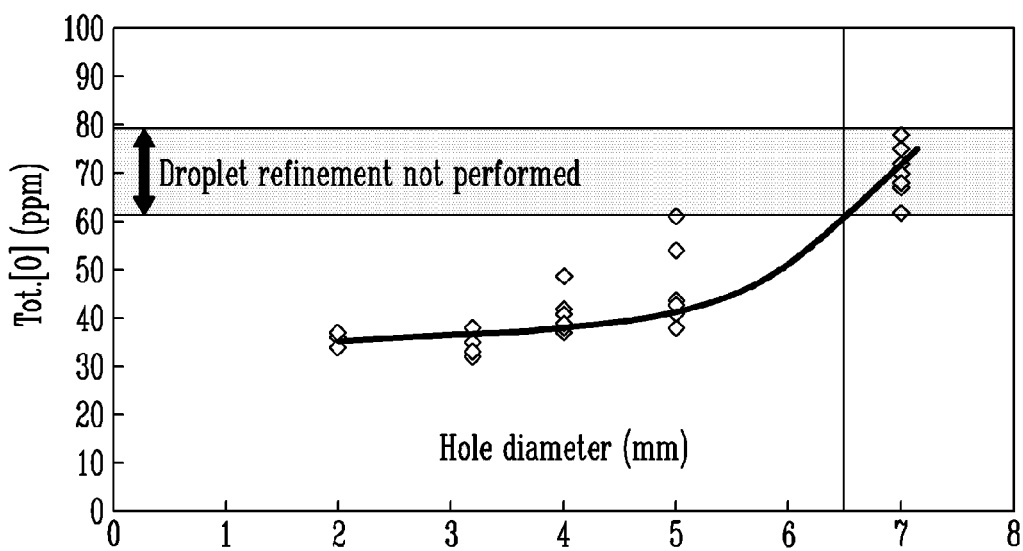
FIG. 5 is a graph showing the relationship of the total oxygen content of molten steel according to size of droplet hole in a droplet forming device according to an embodiment.

FIG. 5 is a graph showing an inclusions refinement effect (change in the total oxygen content) according to size of droplet holes especially in refractories having fine droplet holes between a ladle and a tundish of molten steel refining device to examine a relationship between size of droplet formed by a droplet forming portion and a total oxygen content in molten refining device.

In an embodiment of the present invention, the molten steel formed into droplets is formed through droplet forming holes of the droplet forming device. Therefore, a size of the droplet hole makes it possible to estimate a preferable size of a molten steel droplet of the present invention. In an embodiment of the present invention, particularly when the molten steel is supplied from the ladle to the tundish or from the ladle to the ladle, in order to form the molten steel into droplets, a refractory container including minute droplet holes is placed in a lower region of the molten steel refining device to which the molten steel is poured. When the molten steel is supplied to this container, the molten steel is formed into droplets through the minute droplet holes of the refractories. As can be seen from FIG. 5, in an embodiment of the present invention, it can be identified that the total oxygen content is reduced as the size of the droplet holes of the refractory container decreases. Also, it can be seen that as the size of the droplet holes of the refractory container increases, an average value and deviation of the total oxygen content also increases. Accordingly, this results from the fact that the size of the molten steel droplets increases according to increase in size of the droplet holes of the droplet forming portion which is the refractory container, and the corresponding reduction in the inclusions removal efficiency according to decrease in area ratio per unit volume. Meanwhile, if the size of the droplet hole is 6.5 mm or greater, there is no big difference from the case where no droplet refinement is performed. Therefore, it could be seen that there was almost no droplet refinement effect occurring. Therefore, when the molten steel droplets are formed through installation of the droplet forming device having fine droplet holes in the molten steel refining device, it can be seen that it is preferable to secure a size of refractory holes to be 6.5 mm or less in order to secure the inclusion refinement efficiency.

2. High Cleanliness Molten Steel Refining Device

Next, the molten steel refining device of the present invention as it is applied to continuous casting process will be described. The molten steel refining device of the present invention may be applied to the ladle which is supplied of the molten steel in the steel-making process and the molten steel pool of various types such as the tundish and the like which is supplied of the molten steel in continuous casting process. Hereinafter, embodiments of various high cleanliness molten steel refining devices which may be applied to continuous casting process are first described, and then the high cleanliness molten steel refining device in steel-making process is described.

[First Embodiment of High Cleanliness Molten Steel Refining Device]

Figure 6A:
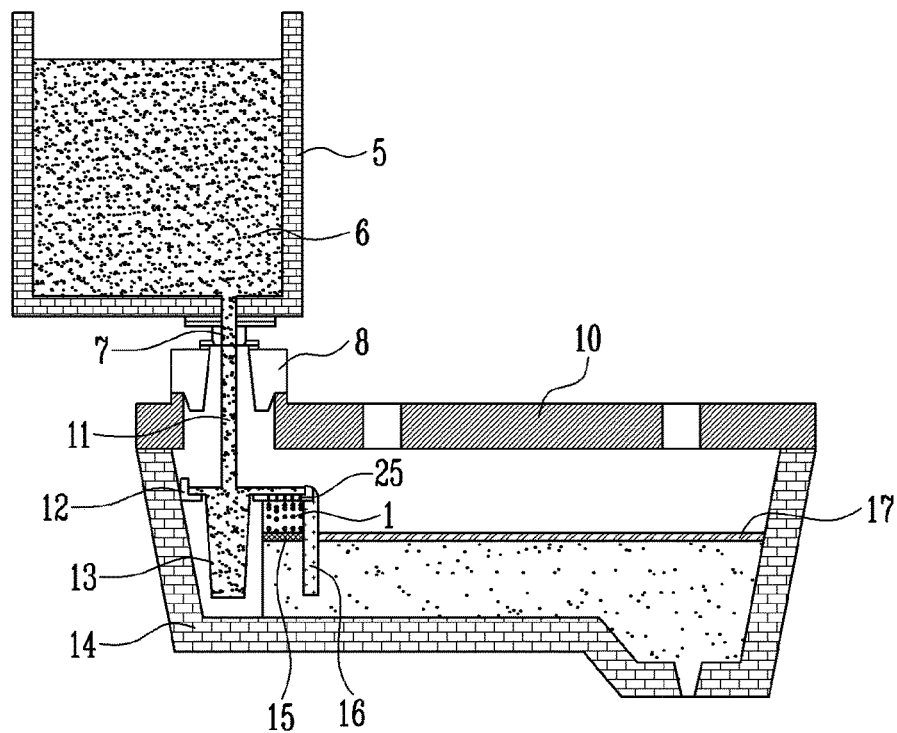
FIGS. 6a, 6b and 6c are cross-sectional views showing schematically a molten steel refining device according to another embodiment.

FIG. 6a is cross-sectional view schematically showing a ladle for forming droplets and a structure of a tundish according to an embodiment, and particularly, showing the tundish including a droplet forming device and the ladle that supplies molten steel to the tundish. Hereinafter, the tundish may include a tundish body and a tundish cover. Therefore, the tundish body hereinafter mentioned may be interpreted as referring to the tundish.

As shown in FIG. 6a, in a refining process through forming the molten steel into droplets in the present invention, molten steel (6) is supplied from a ladle (5) to a tundish body (14) first. Here, the molten steel (6) stored in the ladle (5) is supplied to an open region of the tundish body (14) in the form of molten steel stream (11) via a pouring box (8) by an opening/closing portion (7) (or, a collector nozzle) of a lower portion of the ladle (5). First, a droplet forming process is performed by a droplet forming device formed on one side portion of the tundish body (14) with respect to the molten steel (6) supplied to the tundish body (14) in the molten steel stream (11) form, and the molten steel formed into droplets passes through slag (15) by falling. Thus, refining is achieved. The reference numeral 1 shows the falling of the molten steel that is formed into droplets. Then, the molten steel whose inclusions are removed by passing through the slag (15) is stored in the tundish body (14) by moving to a lower portion of a weir (16).

This is described more in detail by focusing on the droplet forming device. The droplet forming device relating to an embodiment of the present invention includes a molten steel accommodating portion (13) configured to temporarily store the molten steel (6) supplied from the ladle (5) and a droplet forming portion (12) configured to form molten steel into droplets by receiving the molten steel stored in the molten steel accommodating portion (13). Preferably, the droplet forming device is provided adjacent to an opening of the tundish body (14) which receives the molten steel (6) poured from the ladle (5). Particularly, the molten steel accommodating portion (13) is provided adjacent to a lower region where molten steel is supplied to the tundish body (14) via a pouring box (8) of the lower ladle (5), acting as a type of a temporary storing place for molten steel which is made of refractories and which includes an accommodating space to accommodate molten steel inside. And the molten steel accommodating portion (13) is separately provided on one side portion in the tundish body (14).

And the molten steel is supplied to an adjacent droplet forming portion (12) after some of the impact from the fall of the molten steel supplied from the ladle (5) by the molten steel accommodating portion (13) is absorbed. Meanwhile, the droplet forming portion (12) configured to form molten steel, which is flown in via the molten steel accommodating portion (13), into droplets is made in the form of a refractory container, with size and number of holes set preferably in order to cope with common casting speed. And the refractory container may form plural droplet holes (25) at central part. And sidewalls extending from a circumference of the droplet forming portion (12) is made to be supported within the tundish (14). Looking at this more closely, the droplet forming portion (12) is formed to be supported, spreading over upper outer circumference surface of the molten steel accommodating portion (13), but is made such that it does not cover an opening region into which the molten steel of an upper portion of the molten steel accommodating portion (13) is poured. Also, one side wall of the droplet forming portion (12) is provided such that it is supported by inner side wall of the tundish body (14) and other side wall is provide such that it is supported by the weir (16) by installing the at least one weir (16) in the tundish body (14). Here, the droplet forming portion (12) is designed to slant an outer form of the droplet forming portion (12) when a side surface of the tundish is slanted such that it is supported by an inner side surface of the tundish body (14). Obviously, for the tundish body (14) that is not slanted, a projection and the like may be provided so that the side wall of the droplet forming portion (12) is supported. That is, various methods may be employed for a method for providing the droplet forming portion (12) in the tundish body (14), and this does not exceed the scope of the present invention. Meanwhile, the tundish body (14) is covered by a tundish cover (10), and the molten steel for which refining is performed through the droplet forming process is provided in a lower portion of a tundish flux (17) in the tundish body (14) and is discharged through the continuous casting process.

Figure 6B:
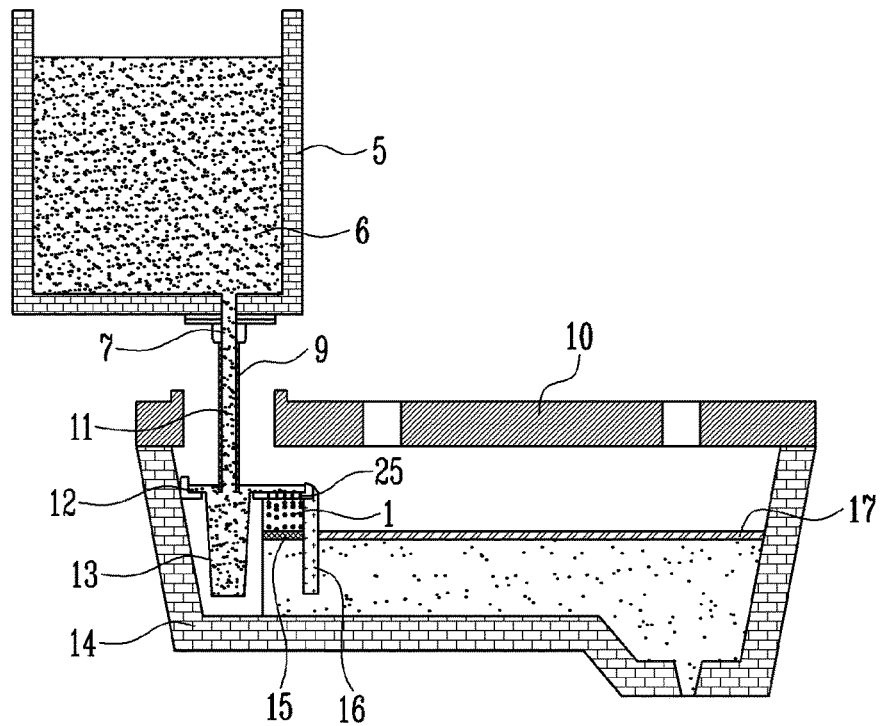

Meanwhile, FIG. 6b shows another structure of the ladle and the tundish relating to the present invention. In FIG. 6b, there is no pouring box (8) provided such as FIG. 6a but a long nozzle (9) is provided at an opening/closing portion (7) of the lower portion of the ladle (5) such that the molten steel (6) is directly poured into the molten steel accommodating portion (13). When the molten steel (6) is poured from the ladle (5) via the long nozzle (9), an impact from the fall when the molten steel (6) falls to the molten steel accommodating portion (13) is reduced, thereby preventing the molten steel from being scattered and the like.

Figure 6C:
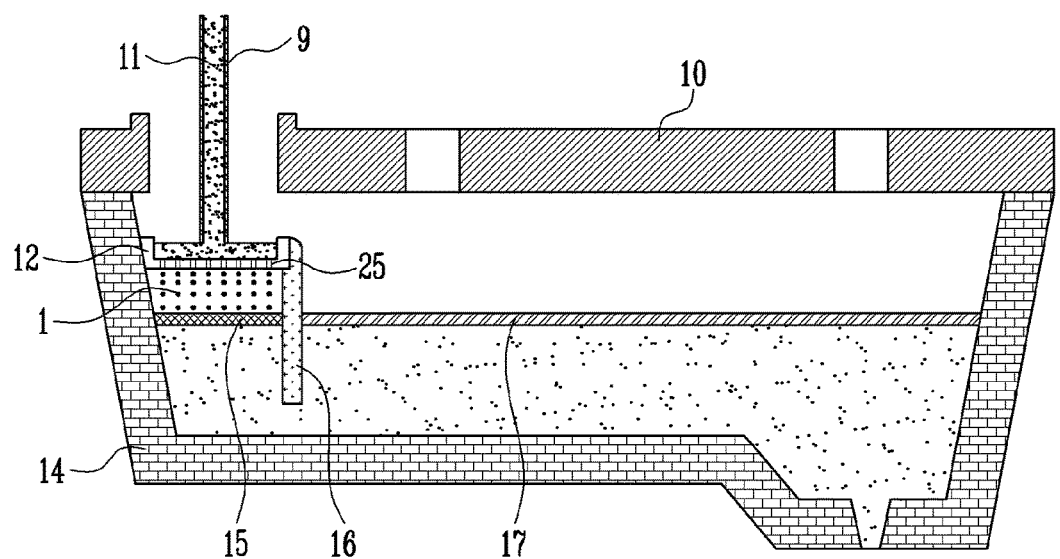

Also, FIG. 6c shows yet another structure of the tundish relating to the present invention. In FIG. 6c, there is no separate molten steel accommodating portion where the molten steel poured from the molten steel storing place, but the molten steel is made to directly pass through the droplet forming portion (12) and thus the refining process is performed. That is, FIG. 6c shows that the droplet forming device of the present invention can be composed based on the droplet forming portion only without including a separate molten steel accommodating portion.

Figure 7A:
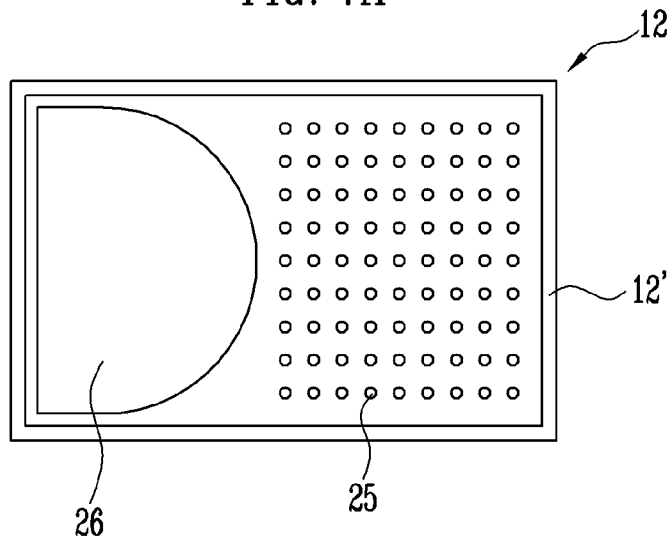
FIG. 7a is a top view showing, particularly, a droplet forming portion in a molten steel refining device according to another embodiment.
Figure 7B:
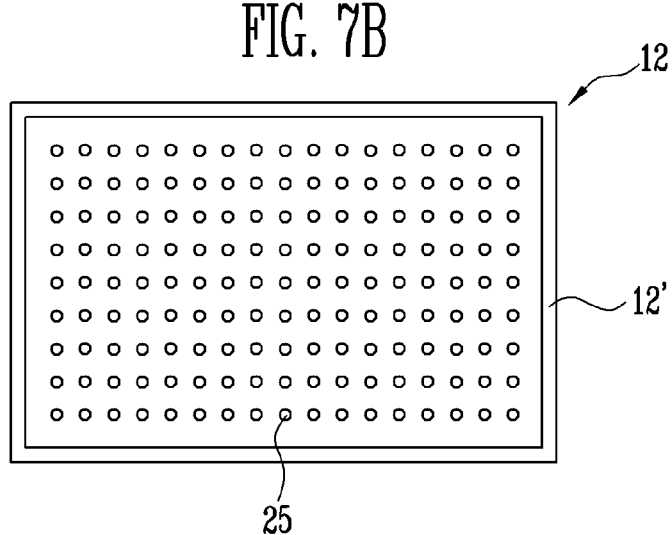
FIGS. 7b and 7c are a top view and a cross sectional view showing, particularly, a droplet forming portion in a molten steel refining device according to another embodiment.
Figure 7C:
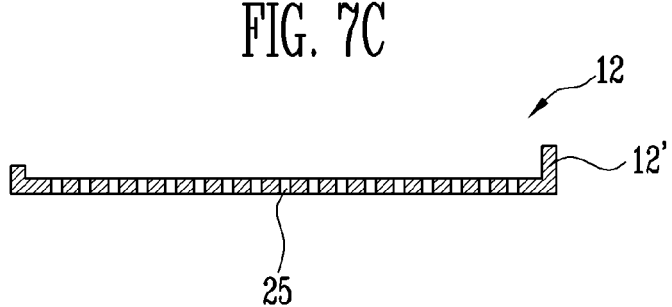

FIGS. 7a, 7b and 7c show detailed structure of the droplet forming portion (12) shown in FIGS. 6a, 6b and 6c. First, looking at FIG. 7a, the droplet forming portion (12) according to the present invention is formed as a container having a shape which corresponds to an inner side surface of the tundish such that the droplet forming portion (12) can be easily provided inside the tundish. Such droplet forming portion (12) includes an opening (26) which is open and which corresponds to an open region of the molten steel accommodating portion (13) such that the droplet forming portion (12) may be provided in the molten steel accommodating portion (13). And the plurality of droplet holes (25) are formed on a side surface of the opening (26). The droplet holes (25) are for allowing slag on a lower portion by forming molten steel that is poured via the molten steel accommodating portion (13) into droplets. Thus, the droplet holes (25) may be formed with specific size and numbers in consideration of casting speed and effectiveness of the refining process. Meanwhile, although not shown in the drawings, the molten steel accommodating portion (13) may be made of column shaped refractories, and an upper portion is coupled in an extended state via the opening (26) or an additional member may be coupled to the opening/closing portion (7) or the pouring box (8) of a ladle as it extends via the opening (26). And an outer side wall (12') of the droplet forming portion (12) may be supported by the inner side surface of the tundish body (14) and the weir (16) formed at the tundish body (14). And an outer circumference surface (26') of the opening (26) may be provided at an upper portion of the molten steel accommodating portion (13) or provided by passing through the column-shaped molten steel accommodating portion (13) via the opening (26).

Meanwhile, FIG. 7b is a top view showing yet another form of the droplet forming portion of the present invention relating to FIG. 6c. FIG. 7c is a cross-sectional view of FIG. 7b. The droplet forming portion (12a) as shown in the drawings is generally made in a form of a rectangular container to cope with the shape of one side portion of the tundish body (14). And the outer side wall (12a') of the droplet forming portion (12) may be provided as it is provided at the inner surface of the tundish body (14) and the weir (16). Also, the plurality of droplet holes (25) are formed for forming droplets as molten steel is poured from the molten steel pool of the ladle and the like.

As such, the molten steel supplied from the molten steel supply device such as ladle and the like configured to store molten steel may go through a droplet forming process as the molten steel is flown in to the droplet forming portion after the molten steel fills the molten steel accommodating portion. And high cleanliness steel may be manufactured by having the molten steel that is formed into droplets pass through slag and refining inclusions. However, the molten steel accommodating portion is not always necessary; it is possible to perform the droplet forming process by having molten steel be directly flown in to the droplet forming portion from the pool that stores molten steel as shown in FIG. 6c. And previously melted or molten slag or solidified slag may be injected into the lower portion of the droplet forming portion to form molten slag with specific thickness or greater. And thus, the molten steel formed into droplets passes through, and the refining process may be performed.

[Second Embodiment of High Cleanliness Molten Steel Refining Device]

Figure 8:
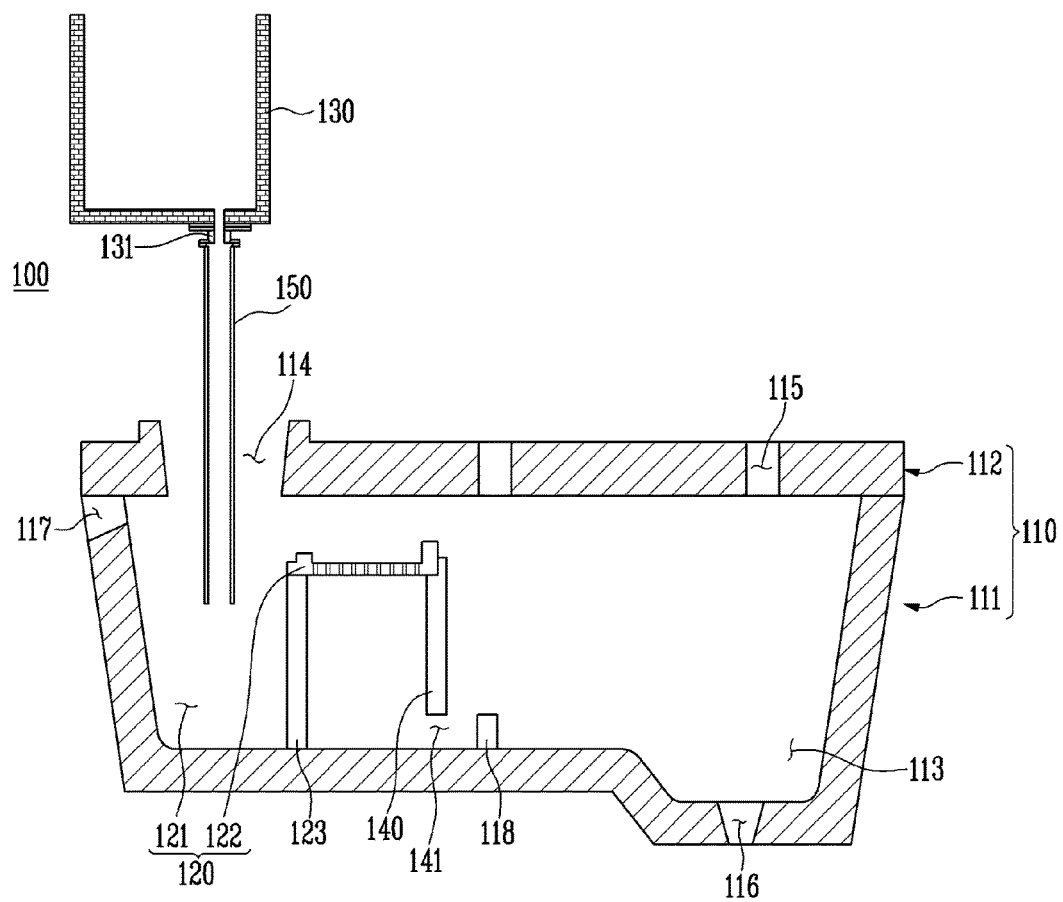
FIG. 8 is a cross-sectional view of a high cleanliness molten steel refining device according to yet another embodiment.
Figure 9:
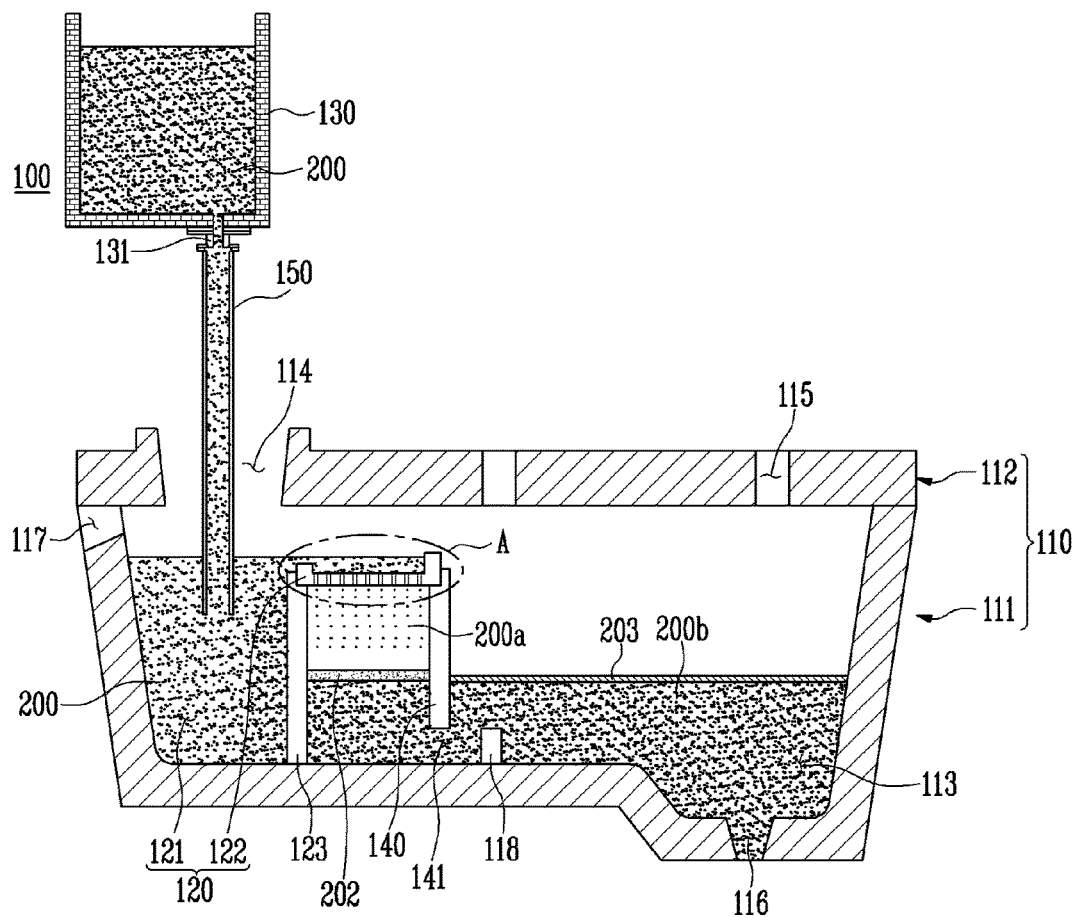
FIG. 9 is a cross-sectional view illustrating a shape in which the high cleanliness molten steel refining device shown in FIG. 8 is filled with molten steel.

FIG. 8 is a cross-sectional view of a high cleanliness molten steel refining device (100) according to another embodiment of the present invention which may be applied to continuous casting process, and FIG. 9 is a cross-sectional view showing a shape in which molten steel (200) is filled in the high cleanliness molten steel refining device (100) as shown in FIG. 8. Hereinafter, the high cleanliness molten steel refining device (100) according to an embodiment will be described in reference to the drawings.

The high cleanliness molten steel refining device (100) according to an embodiment as shown in FIGS. 8 and 9 may include a tundish (110) and a droplet forming device (120) provided in the tundish (110) and configured to form the molten steel (200) into droplets.

The tundish (110) is a member that stores the molten steel (200) it receives from a ladle (130). The tundish (110) may include a tundish body (111) and a tundish cover (112).

Here, the tundish body (111) may accommodate the molten steel (200) supplied from the ladle (130), store molten steel (200a) that is formed into droplets by the droplet forming device (120), and transfer the molten steel (200a) to, for example, a mold and the like. Also, the tundish cover (112) may cover one side of the tundish body (111) which is open and may prevent impurities from penetrating into molten steel (200b) stored in the tundish body (111). Here, injection holes (115) for inserting slag (202) or a tundish flux (203) and the like in the tundish body (111) and an opening (114) that is open such that the molten steel (200) may be injected may be formed on the tundish cover (112). Also, a dam (118) may be provided in the tundish body (111) such that the molten steel (200a) that is formed into droplets may be guided. On one side of the inner side wall of the tundish body (111), there may be formed overflow holes (117) for discharging the molten steel (200) overflowing from the molten steel accommodating portion (121) to outside. Also, on the tundish body (111), there may be formed a molten steel exit (116) such that the molten steel (200b) stored in the tunidsh body (111) is discharged to, for example, a mold and the like.

Meanwhile, a long nozzle (150) may be inserted via the opening (114) formed on the tundish cover (112). Accordingly, the long nozzle (150) may reach an inside of the tundish body (111) by passing through the tundish cover (112), and the molten steel (200) may be supplied to inside of the molten steel accommodating portion (121) through the long nozzle (150). Here, when the molten steel (200) is supplied via the long nozzle (150), impact from collision when the molten steel (200) falls onto the molten steel accommodating portion (121) may be reduced, and thus the molten steel (200) may be prevented from being scattered and the like. However, the present invention is not limited thereto, and it is possible to supply the molten steel (200) to the molten steel accommodating portion (121) in the form of molten steel stream without the long nozzle (150). Also, the molten steel (200) stored in the ladle (130) may be supplied to the molten steel accommodating portion (121) via the long nozzle (150) by the opening/closing of the opening/closing portion (131) such as a collector nozzle, for example.

The droplet forming device (120) is a device that is provided in the tundish (110) and forms the molten steel (200) into droplets. The droplet forming device (120) may include a molten steel accommodating portion (121) and a droplet forming portion (122).

Here, the molten steel accommodating portion (121) may be formed by blocking an inside of the tundish body (111) with a first weir (123). Here, a width of the first weir (123) may be same as a width of the tundish body (111) and may divide into two the tundish body (111) with the first weir (123) and a region that is adjacent to the opening (114) of the tundish cover (112) among the tundish body (111) that is divided into two may be the molten steel accommodating portion (121). Therefore, the molten steel accommodating portion (121) may be sealed by the inner side wall of the tundish body (111) and the first weir (123) except for an upper portion. And the long nozzle (150) may be inserted via the upper portion which is open and may receive the molten steel (200). Meanwhile, the molten steel accommodating portion (121) transfers what overflows from the molten steel (200) that is accommodated after some of the impact from the fall of the molten steel (200) from the ladle (130) is absorbed, to the droplet forming portion (122). The droplet forming portion (122) does not receive large force relatively due to the molten steel accommodating portion (121), and as a result, the possibility that it may be damaged from the impact may be reduced. Also, the molten steel accommodating portion (121) may transfer the molten steel (200) to the droplet forming portion (122) with consistent speed and amount, and therefore, the process efficiency may be improved.

Meanwhile, the droplet forming portion (122) is a member that forms into droplets the molten steel (200) transferred from the molten steel accommodating portion (121). More closely, the droplet forming portion (122) may be provided on an opposite side of the molten steel accommodating portion (121), with the first weir (123) as the reference. Here, as shown in FIG. 2, if the molten steel (200) overflows from the molten steel accommodating portion (121) as the molten steel (200) is continuously supplied to the molten steel accommodating portion (121), the molten steel (200) that overflows may be transferred to the adjacent droplet forming portion (122), and the molten steel (200) that is transferred to the droplet forming portion (122) may be formed into droplets and fall to the molten steel storage portion (113) which is provided on an opposite side of the molten steel accommodating portion (121) from the tundish body (111) which is divided into two by the first weir (123).

Meanwhile, a high cleanliness molten steel refining device (100) according to an embodiment may further include a second weir (140) in the tundish body (111). Here, the second weir (140) may be supported by the inner side wall of the tundish body (111) and the droplet forming portion (122) may be formed in an upper portion. Therefore, the droplet forming portion (122) may be supported by the first weir (123) and the second weir (140). Also, the droplet forming portion (122) may be supported by the inner side wall of the tundish body (111) in a width direction.

Here, an opening (141) may be provided at a lower portion of the second weir (140). Accordingly, the molten steel (200a) which is formed into droplets by passing through the droplet forming portion (122) can freely move in the molten steel storage portion (113) through the opening (141) of the second weir (140), and the molten steel (200b) stored in the molten steel storage portion (113) may be discharged via the molten steel exit (116) into a mold and the like. Meanwhile, the molten steel (200b) may be protected by inserting the tundish flux (203) into an upper surface of the molten steel (200b) stored in the molten steel storage portion (113).

Figure 10:
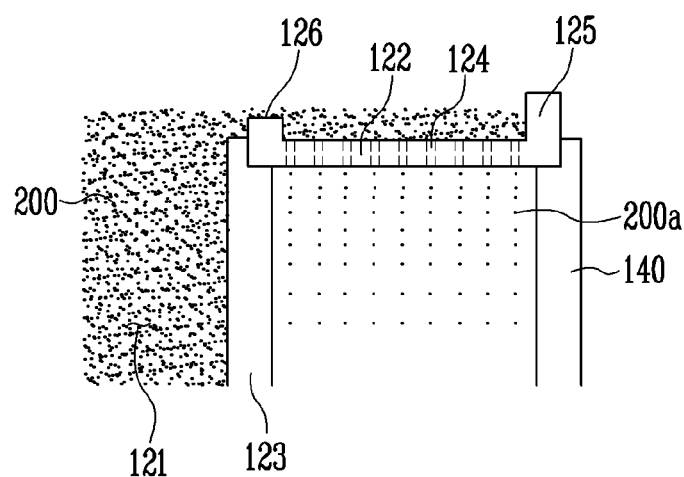
FIG. 10 is an enlarged view of portion A shown in FIG. 9.
Figure 11:
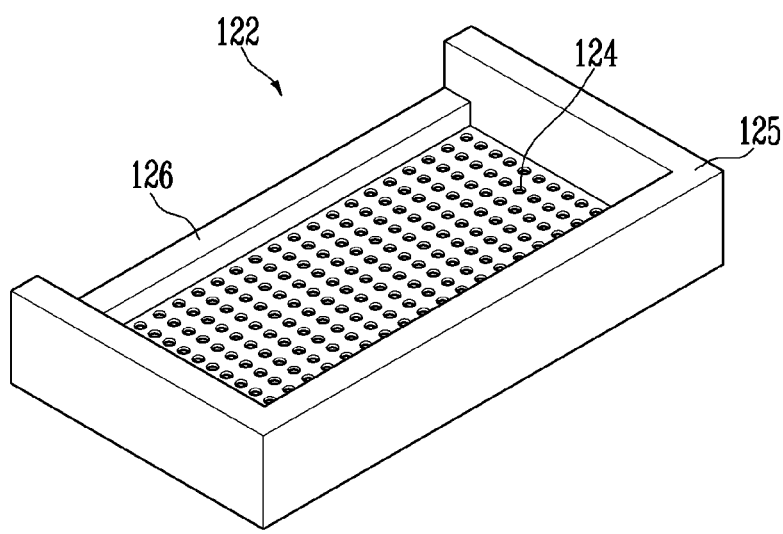
FIG. 11 is a perspective view of a droplet forming portion of the high cleanliness molten steel refining device shown in FIG. 9.

FIG. 10 is a magnified view of A shown in FIG. 9, and FIG. 11 is a perspective view of the droplet forming portion (122) of the high cleanliness molten steel refining device (100) shown in FIG. 9. Hereinafter, the droplet forming portion (122) according to an embodiment is examined in more detail.

As shown in FIGS. 10 and 11, a plurality of droplet holes (124) may be provided at the droplet forming portion (122). Accordingly, the molten steel (200) transferred from the molten steel accommodating portion (121) may be discharged in small size as it passes through the droplet holes (124), i.e., by being formed into droplets. Meanwhile, the size of such droplet holes (124) does not have any great difference from when droplet refining is not practiced if the size is 6.5 mm or greater, and thus there may be little droplet refining effect. Therefore, it is preferable to secure the size of the droplet holes (124) to be 6.5 mm or less. Also, the total oxygen content in the molten steel (200) can be reduced but casting speed may be made slow even when the size of the droplet holes (124) is 6.5 mm or less. Therefore, it is preferable to set the size and number of the droplet holes (124) by considering typical casting speed and refining process effectiveness.

Also, the droplet forming portion (122) may be shaped as a rectangular container so that it corresponds to the inner side wall of the tundish body (111) generally. Outside wall of the droplet forming portion (122) may be provided on the inner wall of the first weir (123), second weir (140) and tundish body (111). Also, to prevent the molten steel (200) which is transferred from the molten steel accommodating portion (121) from being directly transferred to the molten steel storage portion (113) without being overflown from the droplet forming portion (122) and formed into droplets, the stepped part (125, 126) may be provided at the droplet forming portion (122).

As can be seen in FIG. 8, the molten steel that passed through the droplet hole (124) of the droplet forming portion (122) may be formed as microdroplets having specific size. Afterwards, the molten steel that is formed into droplets having specific size fall and collide with a slag surface formed on an upper surface of the molten steel stored in the molten steel storage portion (113). Consequently, inclusions in the molten steel are absorbed by the slag and the molten steel that fell due to specific gravity difference is absorbed by the molten steel stored in the molten steel storage portion (113) (refer to FIG. 9). In this case, for the molten steel that is formed into droplets that passed through slag, the inclusions are removed and thus the molten steel may have outstanding cleanliness.

Also, an amount of the total oxygen may be reduced as the molten steel that is formed into droplets passes through the slag. Here, a response area with respect to the slag for the molten steel formed into droplets becomes large compared to before, and thus the total oxygen amount may be reduced markedly. Also, the inclusions may be removed as the molten steel that is formed into droplets collides with and passes through the slag surface. There appears a phenomenon (Spreading, t1~t8, refer to FIG. 3) in which the molten steel that is formed into droplets that collided with the slag surface after the molten steel formed into droplets contacts the slag surface spreads thinly on the slag surface as time passes. Accordingly, a moving distance of the inclusions of the molten steel formed into droplets is decreased and a moving speed also increases, and thus the inclusions may be easily removed.

FIGS. 6a to 11 showed a device configured to form molten steel into droplets in a tudinsh body in case the molten steel is flown in from a ladle to a tundish. However, the droplet forming device of the present invention may be applied not only to continuous casting process but also to all processes of the steel-making process. Hereinafter, an example of the molten steel refining device which may be applied to steel-making process is explained.

[Third Embodiment of High Cleanliness Molten Steel Refining Device]

Figure 12A:
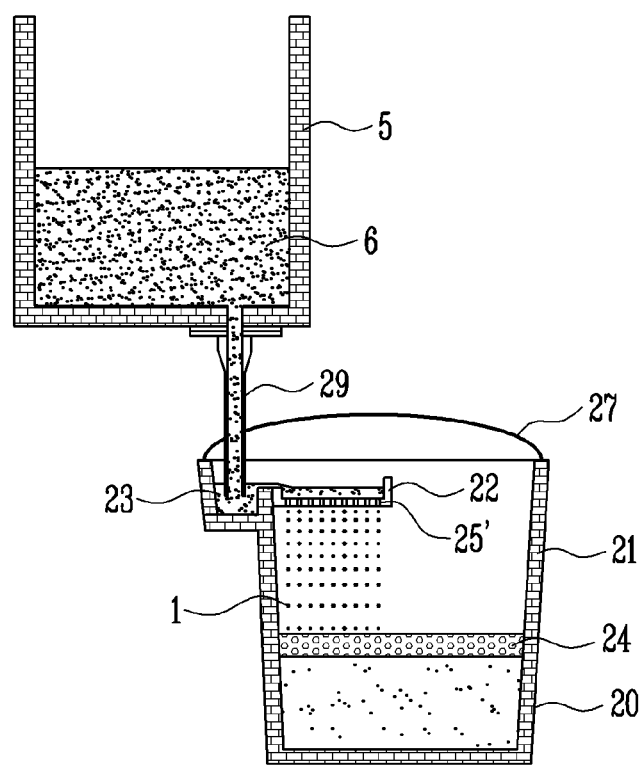
FIG. 12a is a cross sectional view schematically showing a molten steel refining device according to yet another embodiment.
Figure 12B:
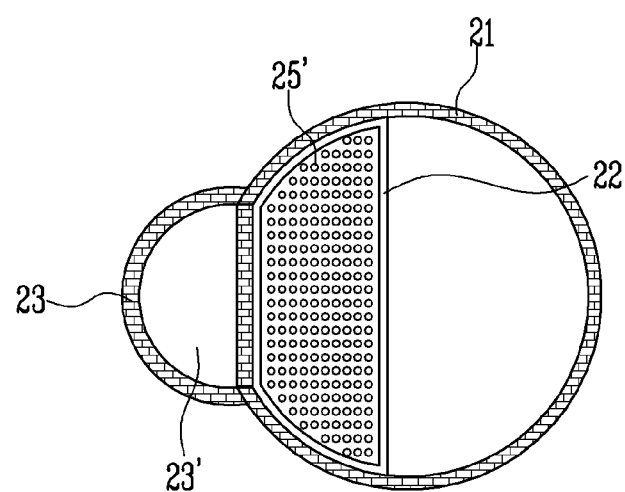
FIG. 12b is a top view of, particularly, a droplet forming device in a molten steel refining device according to yet another embodiment.

FIG. 12a shows refining being practiced by forming molten steel into droplets by supplying the molten steel from the ladle to the ladle to practice the droplet refining on the molten steel for which a molten steel ingredient and deoxidation are completed in the steel-making process. And FIG. 12b shows a cross-sectional diagram of the ladle for which it received the molten steel from the upper portion at the moment.

In an embodiment of the present invention, a ladle for supplying, configured to supply the molten steel from the molten steel supply device and a ladle for accommodating, configured to accommodate the molten steel as an accommodating portion are shown. Here, to offset the amount of the impact from the molten steel (6) injected through a nozzle (29) from an upper side ladle (5) which supplies the molten steel (6), an additional molten steel accommodating portion (23) is formed on one side on an outer circumference surface of a lower ladle (20) at lower ladle (20). And the upper side ladle (5) supplies the molten steel to the molten steel accommodating portion (23) using an opening/closing portion or a long nozzle (29) of the ladle. The molten steel (6) stored in the molten steel accommodating portion (23) is flown in to a droplet forming portion (22) beyond adjacent side wall (21) of the lower ladle (20). The molten steel (6) may be flown in from the droplet forming portion (22) performs a process of forming molten steel into droplets via a plurality of droplet holes (25'). The molten steel formed into droplets passes through slag (24) having specific thickness provided in an inside of the lower ladle (20) by falling. The droplet forming portion (22) may be mounted by being coupled to inner side wall of lower ladle (20) or provided by being seated on side wall. The molten steel formed into droplets through the plurality of droplet holes (25') may fall and pass through the slag (24) on the lower portion, and thus droplet refining is achieved. Here, inactive gas such as argon gas and the like are filled in the ladle (20) on the lower portion, and thus reoxidation of the molten steel is prevented. The inactive gas such as argon gas and the like may be injected through the cover (27) on the upper portion, or may be supplied via the blowing plug on the lower portion. And the ladle (20) on the lower portion may be covered by the ladle cover (27).

Figure 12C:
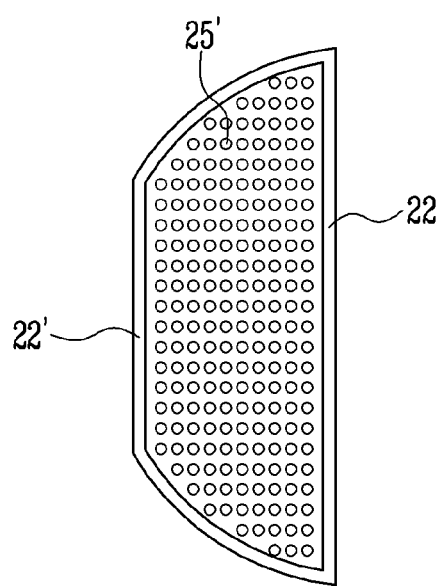
FIG. 12c is a top view showing a droplet forming portion of a droplet forming device according to yet another embodiment.

FIG. 12c is a top view showing a droplet forming portion of a droplet forming device according to an embodiment.

As shown in the drawing, the droplet forming portion (22) in an embodiment consists of a refractory container having a shape that corresponds to one side portion on an inner circumference surface of a ladle. The plurality of droplet holes (25') are formed at a central part of the container, and a circumference of the container consists of side wall (22') extending to upper portion, and the sidewall is configured to receive support from the inner circumference surface of lower ladle (5).

A person having ordinary skill in the art to which the present invention pertains will be able to understand that the present invention may be practiced in other concrete forms without changing technical concept or essential features. Therefore, it should be understood that the above-mentioned embodiments are exemplary in all aspects and not limiting. The scope of the present invention is shown according to the scope of the claims to be described later, and the meaning of the scope and the scope of the claims and all changes or changed forms derived from equivalent concept thereof should be interpreted to be included in the scope of the present invention.

The invention claimed is:

1. A high cleanliness molten steel refining device, comprising:
    a first container adapted to receive molten steel poured from a molten steel supply device; and
    a droplet forming device positioned within the first container and comprising a second container comprising:
        a sidewall separate from any sidewall of the first container; and
        a droplet forming portion having a plurality of droplet holes for forming molten steel into droplets at a central part of the second container,
    wherein the first container is a tundish, the droplet forming device is within a tundish body of the tundish, and the droplet forming device is adjacent to a lower region where molten steel is poured,
    wherein the droplet forming device further comprises a molten steel accommodating portion at a lower portion of a molten steel pouring region in the tundish body to accommodate the molten steel poured from the molten steel supply device and is configured to move the poured-in molten steel to the droplet forming portion via the molten steel accommodating portion, and
    wherein the droplet forming portion further comprises an opening on an opposite side of a region where the plurality of droplet holes are formed is coupled so that an upper portion of the molten steel accommodating portion is passed through via the opening or located at an upper portion of an outer circumference surface of the molten steel storage space of the molten steel accommodating portion so that an upper portion of the molten steel accommodating portion is passed through via the opening.

2. The device of claim 1, wherein the molten steel accommodating portion is adjacent to an inner side surface and a lower side surface of the tundish body at a lower region of the molten steel pouring region.

3. The device of claim 2, wherein the droplet forming portion is supported by a weir provided in the tundish body.

4. The device of claim 3, wherein a portion of the sidewall of the second container on one side of the droplet forming portion is supported by the weir and a portion of the sidewall of the second container on another side is supported by the molten steel accommodating portion.

5. The device of claim 3, wherein a portion of the sidewall of the second container on the one side of the droplet forming portion is supported by the weir and a portion of the sidewall of the second container on the another side is supported by being coupled to an inner side surface of the tundish body.

6. A high cleanliness molten steel refining device, comprising:
    a first container adapted to receive molten steel poured from a molten steel supply device; and
    a droplet forming device positioned within the first container and comprising a second container comprising:
        a sidewall separate from any sidewall of the first container; and
        a droplet forming portion having a plurality of droplet holes for forming molten steel into droplets at a central part of the second container,
    wherein the first container is a tundish,
    wherein the droplet forming device is within a tundish body of the tundish, and wherein the droplet forming device is adjacent to a lower region where molten steel is poured,
    wherein the droplet forming device further comprises a molten steel accommodating portion at a lower portion of a molten steel pouring region in the tundish body to accommodate the molten steel poured from the molten steel supply device and is configured to move the poured-in molten steel to the droplet forming portion via the molten steel accommodating portion,
    wherein a portion of the sidewall of the second container adjacent to the molten steel accommodating portion is formed lower than a portion of the sidewall on another side.

7. The device of claim 1, wherein the droplet hole is 6.5 mm or less in diameter.

8. A high cleanliness molten steel refining device comprising:
    a tundish including a tundish body and a tundish cover for covering a side of the tundish body; and
    a droplet forming device comprising:
        a molten steel accommodating portion formed by blocking the tundish body with a first weir; and
        a droplet forming portion provided adjacent to the molten steel accommodating portion in the tundish body comprising:
            a container comprising:
                a sidewall separate from any sidewall of the tundish; and
                a droplet forming portion having a plurality of droplet holes for forming molten steel into droplets at a central part of the container.

9. The device of claim 8, wherein the molten steel accommodating portion is a space between the first weir and an inner side wall of the tundish body.

10. The device of claim 8, wherein the droplet forming portion and the molten steel accommodating portion are on opposite sides of the first weir.

11. The device of claim 8, further comprising a second weir supported on an inner sidewall of the tundish body and supporting the droplet forming portion.

12. The device of claim 11, wherein the droplet forming portion is supported by the first weir and the second weir in a space between the first weir and the second weir.

13. The device of claim 12, wherein a lower portion of the second weir is open.

14. The device of claim 8, wherein the molten steel, overflown from the molten steel accommodating portion, is transferred to the droplet forming portion.

15. The device of claim 8, wherein the molten steel formed into droplets by passing through the droplet forming portion is stored in a molten storage portion formed on an opposite side of the molten steel accommodating portion of the tundish body.

16. The device of claim 15, wherein the molten steel formed into droplets by passing through the droplet forming portion is stored in the molten steel storage portion in a state in which the molten steel is refined by passing through slag.

17. The device of claim 8, wherein the droplet forming portion comprises stepped parts, wherein a height of a stepped part adjacent to the molten steel accommodating portion is lower than a height of another stepped part that is more distanced away from the molten steel accommodating portion than the adjacent stepped part.

18. The device of claim 8, wherein the molten steel accommodating portion is configured to receive the molten steel supplied from a ladle via a long nozzle.

19. The device of claim 8, wherein the droplet hole is 6.5 mm or less in diameter.

* * * * *